US012230183B2

(12) United States Patent
Lee et al.

(10) Patent No.: US 12,230,183 B2
(45) Date of Patent: Feb. 18, 2025

(54) DISPLAY DEVICE

(71) Applicant: Samsung Display Co., LTD., Yongin-si (KR)

(72) Inventors: Seongjoo Lee, Yongin-si (KR); Joon-Chul Goh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/370,460

(22) Filed: Sep. 20, 2023

(65) Prior Publication Data

US 2024/0169881 A1 May 23, 2024

(30) Foreign Application Priority Data

Nov. 23, 2022 (KR) ........................ 10-2022-0158324

(51) Int. Cl.
*G09G 3/20* (2006.01)

(52) U.S. Cl.
CPC ..................... *G09G 3/2092* (2013.01); *G09G 2300/0452* (2013.01); *G09G 2300/0828* (2013.01); *G09G 2310/0275* (2013.01); *G09G 2310/08* (2013.01)

(58) Field of Classification Search
CPC ............... G09G 3/3685; G09G 3/3688; G09G 2310/0297
See application file for complete search history.

(56) References Cited

U.S. PATENT DOCUMENTS 6,157,358 A * 12/2000 Nakajima ............ G09G 3/3648 345/98
2006/0146128 A1* 7/2006 Ma ........................ G09G 3/3611 348/89
2008/0150874 A1* 6/2008 Kida .................... G09G 3/3696 345/100
2016/0093260 A1* 3/2016 Watsuda .............. G09G 3/3611 345/87
2017/0061928 A1* 3/2017 Kim ...................... G09G 3/3685
2017/0316747 A1* 11/2017 Matsueda ............ G09G 3/3614
2022/0020307 A1* 1/2022 Hong ....................... G09G 3/20

FOREIGN PATENT DOCUMENTS

KR 100962916 B1 6/2010
KR 1020170031323 A 3/2017
KR 102353736 B1 1/2022

* cited by examiner

*Primary Examiner* — Yuzhen Shen
(74) *Attorney, Agent, or Firm* — CANTOR COLBURN LLP

(57) ABSTRACT

A display device includes a display panel including pixels arranged along a plurality of pixel lines, each pixel line extending in a first direction, a data driver which applies data voltages to the pixels, and a timing controller which controls the data driver. The data driver includes first channels which applies the data voltages to the pixels of first pixel lines and is adjacent to the display panel in the first direction, and second channels which applies the data voltages to the pixels of second pixel lines and is adjacent to the display panel in a direction opposite to the first direction.

20 Claims, 14 Drawing Sheets

DISPLAY DEVICE

This application claims priority to Korean Patent Application No. 10-2022-0158324, filed on Nov. 23, 2022, and all the benefits accruing therefrom under 35 USC § 119, the content of which in its entirety is herein incorporated by reference.

BACKGROUND

1. Field

Embodiments of the disclosure relate to a display device. More particularly, embodiments of the disclosure relate to a display device including channels.

2. Description of the Related Art

In general, a display device may include a display panel, a gate driver, a data driver, and a timing controller. The display panel may include a plurality of gate lines, a plurality of data lines, and a plurality of pixels electrically connected to the gate lines and the data lines. The gate driver may provide gate signals to the gate lines, the data driver may provide data voltages to the data lines, and the timing controller may control the gate driver and the data driver.

Recently, a display device configured to provide virtual reality (VR) or augmented reality (AR) is emerging. Accordingly, a display device having a low area and high pixels per inch (ppi) may be desired.

SUMMARY

In a display device having a low area and high ppi for VR or AR, elements of the display device may be integrated into a narrow area as much as possible. However, there are limitations in integrating some elements, which have minimum widths to satisfy design rules in design, into a narrow area.

Embodiments of the disclosure provide a display device including channels having wide channel widths.

According to embodiments, a display device includes a display panel including pixels arranged along a plurality of pixel lines, each pixel line extending in a first direction, a data driver which applies data voltages to the pixels, and a timing controller which controls the data driver. In such embodiments, the data driver includes first channels which applies the data voltages to the pixels of first pixel lines and is adjacent to the display panel in the first direction and second channels which applies the data voltages to the pixels of second pixel lines and is adjacent to the display panel in a direction opposite to the first direction.

In an embodiment, at least one of the first pixel lines may be a $(2N-1)^{th}$ pixel line, where N is a positive integer. In such an embodiment, at least one of the second pixel lines may be a $2N^{th}$ pixel line.

In an embodiment, each of the pixels may include sub-pixels. In such an embodiment, each of the first channels may be connected to the sub-pixels of the pixels of a corresponding one of the first pixel lines. In such an embodiment, each of the second channels may be connected to the sub-pixels of the pixels of a corresponding one of the second pixel lines.

In an embodiment, the data driver may generate the data voltages applied to the sub-pixels based on a common gamma reference voltage.

In an embodiment, each of the pixels may include a first color sub-pixel which displays a first color, a second color sub-pixel which displays a second color, and a third color sub-pixel which displays a third color. In such an embodiment, at least one of the first channels may be connected to the first color sub-pixel of each of the pixels of at least two of the first pixel lines. In such an embodiment, at least one of the second channels may be connected to the first color sub-pixel of each of the pixels of at least two of the second pixel lines.

In an embodiment, the data driver may generate the data voltages applied to the first color sub-pixel based on a first color gamma reference voltage for the first color, generate the data voltages applied to the second color sub-pixel based on a second color gamma reference voltage for the second color, and generate the data voltages applied to the third color sub-pixel based on a third color gamma reference voltage for the third color.

In an embodiment, the data driver may be mounted on the display panel.

According to embodiments, a display device includes a display panel including pixels arranged along a plurality of pixel lines, each pixel line extending in a first direction, a data driver which applies data voltages to the pixels, and a timing controller which controls the data driver. In such an embodiment, the data driver includes first channels which applies the data voltages to the pixels of first pixel lines and is adjacent to the display panel in the first direction and second channels which applies the data voltages to the pixels of second pixel lines and is adjacent to the first channels in the first direction.

In an embodiment, at least one of the first pixel lines may be a $(2N-1)^{th}$ pixel line, where N is a positive integer. In such an embodiment, at least one of the second pixel lines may be a $2N^{th}$ pixel line.

In an embodiment, each of the pixels may include sub-pixels. In such an embodiment, each of the first channels may be connected to the sub-pixels of the pixels of a corresponding one of the first pixel lines. In such an embodiment, each of the second channels may be connected to the sub-pixels of the pixels of a corresponding one of the second pixel lines.

In an embodiment, the data driver may generate the data voltages applied to the sub-pixels based on a common gamma reference voltage.

In an embodiment, each of the pixels may include a first color sub-pixel which displays a first color, a second color sub-pixel which displays a second color, and a third color sub-pixel which displays a third color. In such an embodiment, at least one of the first channels may be connected to the first color sub-pixel of each of the pixels of at least two of the first pixel lines. In such an embodiment, at least one of the second channels may be connected to the first color sub-pixel of each of the pixels of at least two of the second pixel lines.

In an embodiment, the data driver may generate the data voltages applied to the first color sub-pixel based on a first color gamma reference voltage for the first color, generate the data voltages applied to the second color sub-pixel based on a second color gamma reference voltage for the second color, and generate the data voltages applied to the third color sub-pixel based on a third color gamma reference voltage for the third color.

In an embodiment, the data driver may further include third channels which applies the data voltages to the pixels of third pixel lines and is adjacent to the second channels in the first direction.

In an embodiment, at least one of the first pixel lines may be a $(3N-2)^{th}$ pixel line, where N is a positive integer. In such an embodiment, at least one of the second pixel lines may be a $(3N-1)^{th}$ pixel line. In such an embodiment, at least one of the third pixel lines may be a $3N^{th}$ pixel line.

In an embodiment, each of the pixels may include sub-pixels. In such an embodiment, each of the first channels may be connected to the sub-pixels of the pixels of a corresponding one of the first pixel lines. In such an embodiment, each of the second channels may be connected to the sub-pixels of the pixels of a corresponding one of the second pixel lines. In such an embodiment, each of the third channels may be connected to the sub-pixels of the pixels of a corresponding one of the third pixel lines.

In an embodiment, each of the pixels may include a first color sub-pixel which display a first color, a second color sub-pixel which display a second color, and a third color sub-pixel which display a third color. In such an embodiment, at least one of the first channels may be connected to the first color sub-pixel of each of the pixels of at least one of the first pixel lines, the first color sub-pixel of each of the pixels of at least one of the second pixel lines, and the first color sub-pixel of each of the pixels of at least one of the third pixel lines. In such an embodiment, at least one of the second channels may be connected to the second color sub-pixel of each of the pixels of at least one of the first pixel lines, the second color sub-pixel of each of the pixels of at least one of the second pixel lines, and the second color sub-pixel of each of the pixels of at least one of the third pixel lines. In such an embodiment, at least one of the third channels may be connected to the third color sub-pixel of each of the pixels of at least one of the first pixel lines, the third color sub-pixel of each of the pixels of at least one of the second pixel lines, and the third color sub-pixel of each of the pixels of at least one of the third pixel lines.

According to embodiments, a display device includes a display panel including pixels arranged along a plurality of pixel lines, each pixel line extending in a first direction, a data driver which applies data voltages to the pixels, a timing controller which controls the data driver, and an integrated channel including a first source amplifier which applies the data voltages to the pixels of a first pixel line and is adjacent to the display panel in the first direction, and a second source amplifier which apply the data voltages to the pixels of a second pixel line and is adjacent to the first source amplifier in the first direction.

In an embodiment, the integrated channel may further include a first digital-to-analog converter which applies the data voltages to the first source amplifier and is adjacent to the second source amplifier in the first direction and a second digital-to-analog converter which applies the data voltages to the second source amplifier and is adjacent to the first digital-to-analog converter in the first direction.

In an embodiment, the integrated channel may further include a third source amplifier which applies the data voltages to the pixels of a third pixel line and is adjacent to the second source amplifier in the first direction, a first digital-to-analog converter which applies the data voltages to the first source amplifier and is adjacent to the third source amplifier in the first direction, a second digital-to-analog converter which applies the data voltages to the second source amplifier and is adjacent to the first digital-to-analog converter in the first direction, and a third digital-analog converter which applies the data voltages to the third source amplifier and is adjacent to the second digital-analog converter in the first direction.

Therefore, a display device according to embodiments may be allowed to have a wide channel width as compared with a case where a single channel is connected to each of sub-pixels in one pixel row.

However, the effects of the disclosure are not limited thereto. Thus, the effects of the disclosure may be extended without departing from the spirit and the scope of the disclosure.

DETAILED DESCRIPTION

Figure 1:
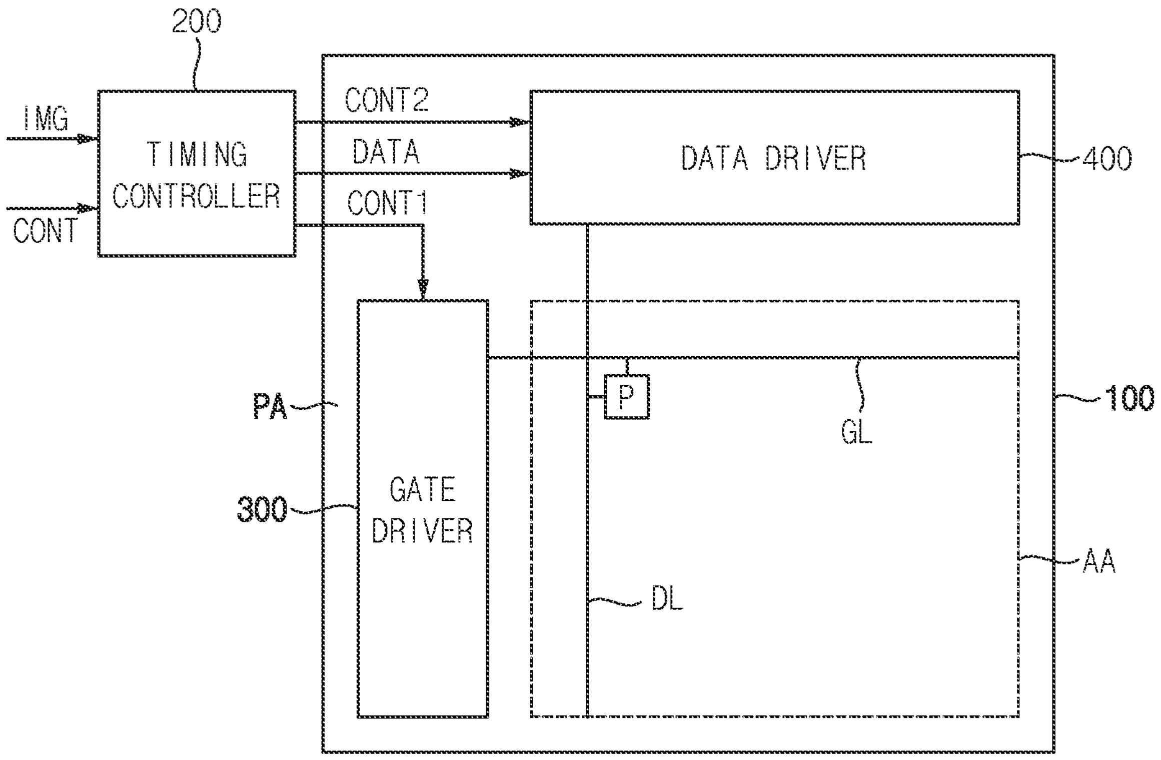
FIG. 1 is a block diagram showing a display device according to embodiments of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

FIG. 1 is a block diagram showing a display device according to embodiments of the disclosure.

Referring to FIG. 1, an embodiment of a display device may include a display panel 100, a timing controller 200, a gate driver 300, and a data driver 400. According to an embodiment, the timing controller 200 and the data driver 400 may be integrated into a single chip.

The display panel 100 may include a display part AA configured to display an image, and a peripheral part PA that is adjacent to the display part AA. According to an embodiment, the gate driver 300 may be mounted on the peripheral part PA. According to an embodiment, the data driver 400 may be mounted on the peripheral part PA.

The display panel 100 may include a plurality of gate lines GL, a plurality of data lines DL, and a plurality of pixels P electrically connected to the gate lines GL and the data lines DL. The gate lines GL and the data lines DL may extend in directions intersecting each other (e.g., a first direction D1 and a second direction D2 shown in FIG. 1).

The timing controller 200 may receive input image data IMG and an input control signal CONT from an outside or a main processor (e.g., a graphic processing unit (GPU), etc.). In an embodiment, for example, the input image data IMG may include red image data, green image data, and blue image data. According to an embodiment, the input image data IMG may further include white image data. In an alternative embodiment, for example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, and a data signal DATA based on the input image data IMG and the input control signal CONT.

The timing controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The gate driver 300 may generate gate signals for driving the gate lines GL in response to the first control signal CONT1 received from the timing controller 200. The gate driver 300 may output the gate signals to the gate lines GL. In an embodiment, for example, the gate driver 300 may sequentially output the gate signals to the gate lines GL.

The data driver 400 may receive the second control signal CONT2 and the data signal DATA from the timing controller 200. The data driver 400 may generate data voltages obtained by converting the data signal DATA into an analog voltage. The data driver 400 may output the data voltages to the data lines DL.

Figure 2:
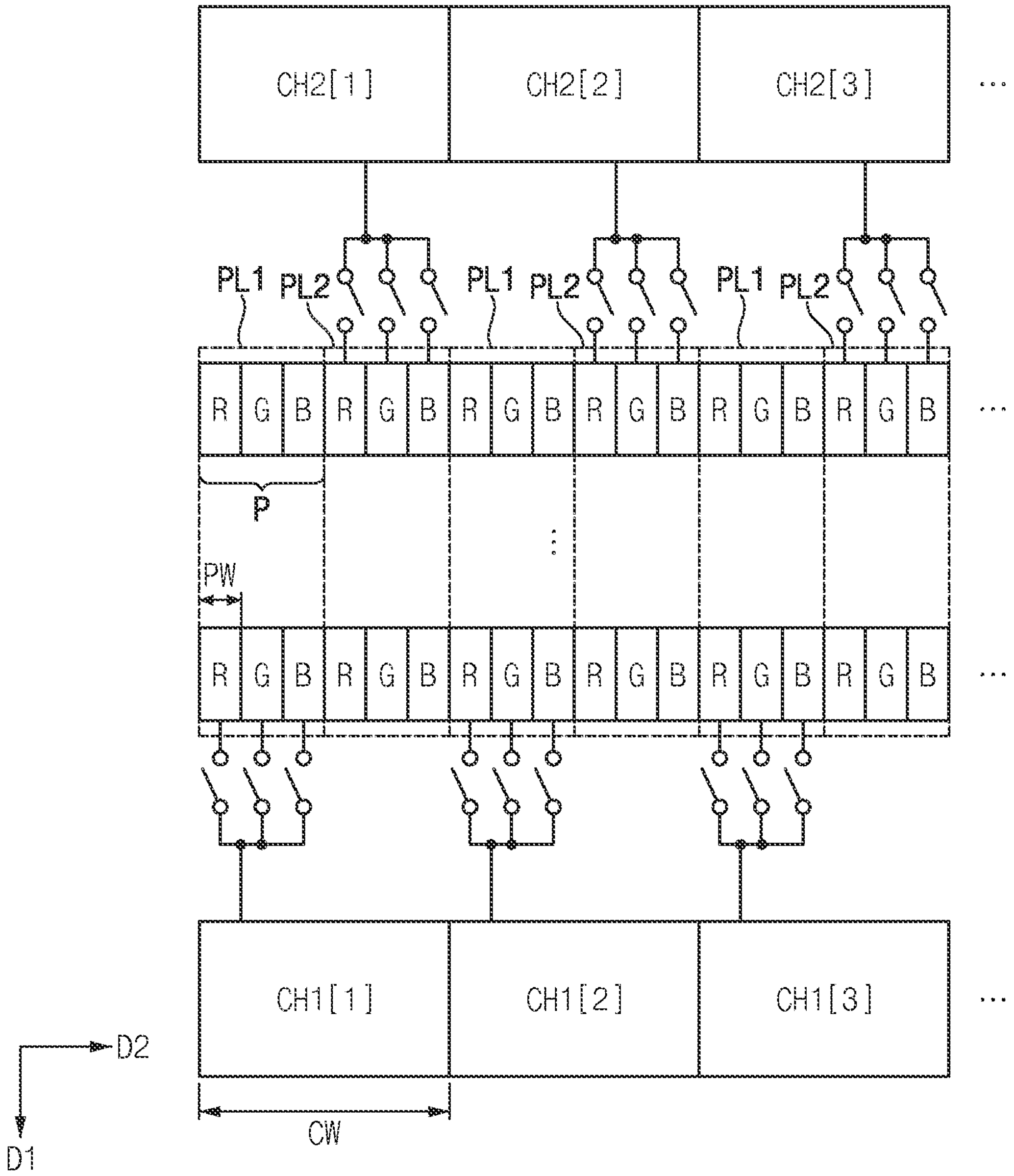
FIG. 2 is a view showing one example in which a data driver of the display device of FIG. 1 is connected to pixels.
Figure 3:
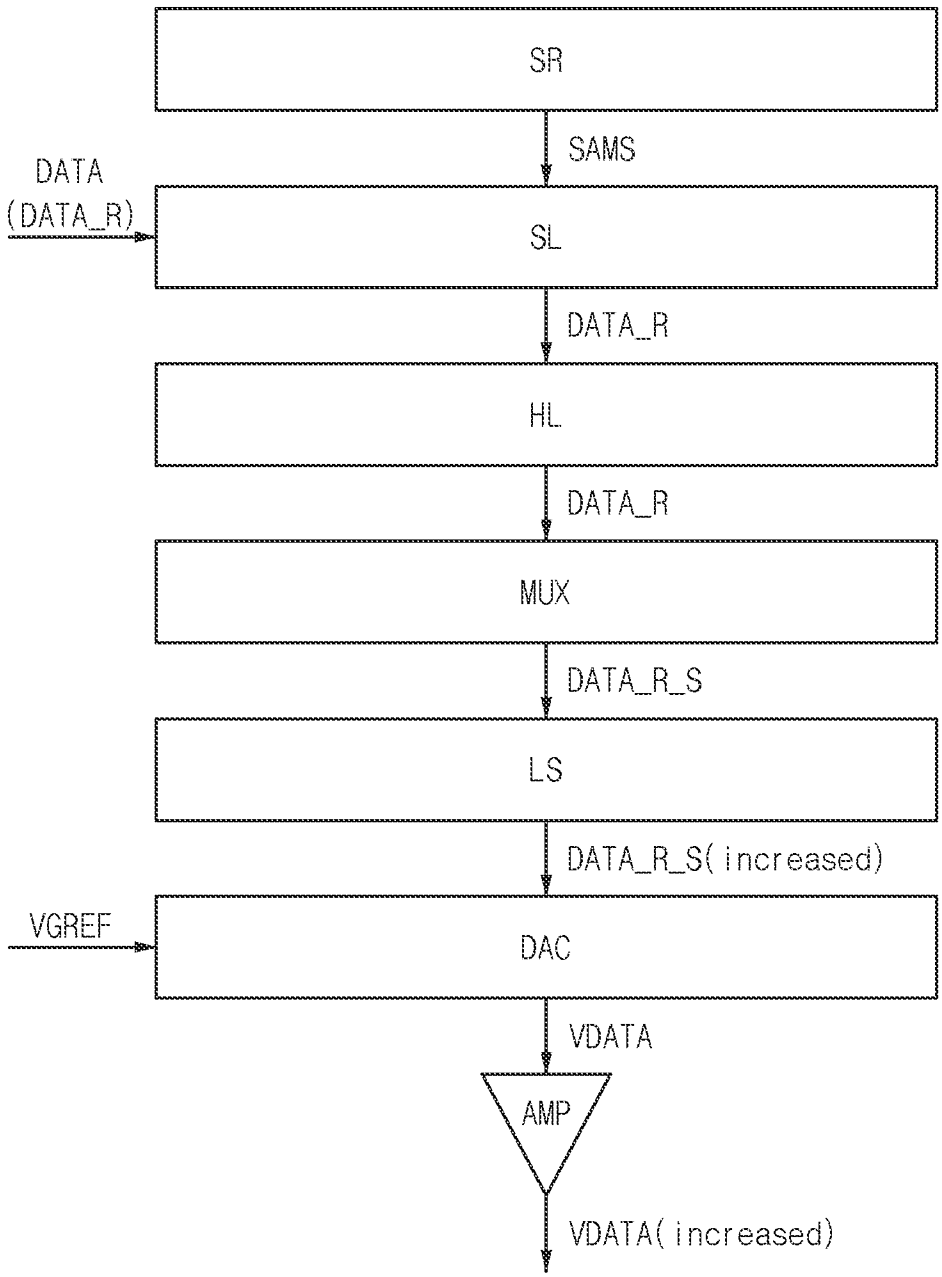
FIG. 3 is a view showing one example of channels of FIG. 2.

FIG. 2 is a view showing one example in which a data driver 400 of the display device of FIG. 1 is connected to pixels P, and FIG. 3 is a view showing one example of channels CH1[1], CH1[2], CH1[3], . . . , CH2[1], CH2[2], CH2[3], . . . of FIG. 2.

Referring to FIGS. 1 and 2, an embodiment of the data driver 400 may include: first channels CH1[1], CH1[2], CH1[3], . . . configured to apply the data voltages to the pixels P of first pixel lines PL1 among the pixels P, and adjacent to the display panel 100 in a first direction D1; and second channels CH2[1], CH2[2], CH2[3], . . . configured to apply the data voltages to the pixels P of second pixel lines PL2 among the pixels P, and adjacent to the display panel 100 in a direction opposite to the first direction D1.

At least one of the first pixel lines PL1 may be a $(2N-1)^{th}$ pixel line (where N is a positive integer), and at least one of the second pixel lines PL2 may be a $2N^{th}$ pixel line. An order of the pixel lines PL1 and PL2 may be defined in a second direction D2.

According to an embodiment, the first pixel lines PL1 may be $(2N-1)^{th}$ pixel lines, and the second pixel lines PL2 may be $2N^{th}$ pixel lines. In such an embodiment, the first pixel lines PL1 may be odd-numbered pixel lines, and the second pixel lines PL2 may be even-numbered pixel lines.

Each of the pixels P may include a first color sub-pixel R configured to display a first color, a second color sub-pixel G configured to display a second color, and a third color sub-pixel B configured to display a third color. In an embodiment, for example, the first color may be a red color, the second color may be a green color, and the third color may be a blue color.

Each of the first channels CH1[1], CH1[2], CH1[3], . . . may be connected to the sub-pixels R, G, and B of the pixels P of a corresponding one of the first pixel lines PL1, and each of the second channels CH2[1], CH2[2], CH2[3], . . . may be connected to the sub-pixels R, G, and B of the pixels P of a corresponding one of the second pixel lines PL2.

Each of the channels CH1[1], CH1[2], CH1[3], . . . , CH2[1], CH2[2], CH2[3], . . . may selectively apply the data voltages (e.g., via a switching operation) to the sub-pixels R, G, and B of the pixels P of the corresponding one of the first pixel lines PL1. In an embodiment, for example, each of the channels CH1[1], CH1[2], CH1[3], . . . , CH2[1], CH2[2], CH2[3], . . . may sequentially apply the data voltages to the first color sub-pixels R, the second color sub-pixels G, and the third color sub-pixels B of the pixels P of the corresponding one of the second pixel lines PL2. However, the disclosure is not limited to an order of applying the data voltages.

In an embodiment, as shown in FIG. 2, a channel width CW may be six times a pixel width PW. In such an embodiment, the display device may have a wide channel width CW as compared with a case where one of the channels CH1[1], CH1[2], CH1[3], . . . , CH2[1], CH2[2], CH2[3], . . . is connected to one of the sub-pixels R, G, and B in one pixel row, and the channels CH1[1], CH1[2], CH1[3], . . . , CH2[1], CH2[2], CH2[3], . . . are arranged in a row in the second direction D2. Therefore, the display device may ensure a minimum width to satisfy design rules in design.

In such an embodiment, the channel width CW may be a width of an area occupied by one of the channels CH1[1], CH1[2], CH1[3], . . . , CH2[1], CH2[2], CH2[3], . . . , and the pixel width PW may be a width of an area occupied by one of the sub-pixels R, G, and B.

Referring to FIGS. 1 to 3, each of the channels CH1[1], CH1[2], CH1[3], . . . , CH2[1], CH2[2], CH2[3], . . . may include a shift register SR, a sampling latch SL, a holding latch HL, a multiplexer MUX, a level shifter LS, a digital-to-analog converter DAC, and a source amplifier AMP.

The shift register SR may generate a sampling signal SAMS in response to a data clock signal. In an embodiment, for example, the shift registers SR of the channels CH1[1], CH1[2], CH1[3], . . . , CH2[1], CH2[2], CH2[3], . . . may sequentially generate the sampling signals SAMS.

The sampling latch SL may store a corresponding portion of a data signal DATA_R of a pixel row applied from the timing controller 200 in response to the sampling signal SAMS. In an embodiment, for example, the sampling latches SL of the channels CH1[1], CH1[2], CH1[3], . . . , CH2[1], CH2[2], CH2[3], . . . may sequentially store the data signals DATA_R of the pixel row in response to the sampling signals SAMS.

The holding latch HL may receive and store the data signal DATA_R of the pixel row from the sampling latch SL in response to a load signal, and may apply the data signal DATA_R of the pixel row to the multiplexer MUX.

The multiplexer MUX may select a data signal DATA_R_S corresponding to an applied data voltage VDATA from the data signal DATA_R of the pixel row. In an embodiment, for example, as shown in FIG. 2, one of the channels CH1[1], CH1[2], CH1[3], . . . , CH2[1], CH2[2], CH2[3], . . . may be connected to a plurality of sub-pixels R, G, and B in one pixel row, and may selectively apply the data voltages VDATA to the connected sub-pixels R, G, and B. In an embodiment, for example, one of the channels CH1[1], CH1[2], CH1[3], . . . , CH2[1], CH2[2], CH2[3], . . . may sequentially apply the data voltages VDATA to the first color sub-pixel R, the second color sub-pixel G, and the third color sub-pixel B. Therefore, the multiplexer MUX may select the data signal DATA_R_S corresponding to the data voltage VDATA applied to one of the first color sub-pixel R, the second color sub-pixel G, and the third color sub-pixel B from the data signal DATA_R of the pixel row to apply the selected data signal DATA_R_S to the level shifter LS.

The level shifter LS may shift a voltage level of the data signal DATA_R_S corresponding to the applied data voltage VDATA. In an embodiment, for example, the level shifter LS may increase the voltage level of the data signal DATA_R_S corresponding to the applied data voltage VDATA to apply the data signal DATA_R_S with the increased voltage level to the digital-to-analog converter DAC.

The digital-to-analog converter DAC may generate the data voltages VDATA applied to the sub-pixels R, G, and B based on a common gamma reference voltage VGREF.

In an embodiment, for example, the data voltage VDATA for each gray level may be determined through voltage distribution of the common gamma reference voltage VGREF. In such an embodiment, the digital-to-analog converter DAC may generate the data voltages VDATA for all colors (e.g., the first to third colors) based on a same gamma reference voltage (i.e., the common gamma reference voltage VGREF). Therefore, voltage levels of the data voltages VDATA applied to the first color sub-pixel R, the second color sub-pixel G, and the third color sub-pixel B may be equal to each other for a same gray level.

The source amplifier AMP may receive the data voltage VDATA from the digital-to-analog converter DAC to apply the received data voltage VDATA to the pixels P. In an embodiment, for example, the source amplifier AMP may amplify the data voltage VDATA to apply the amplified data voltage VDATA to the pixels P.

Figure 4:
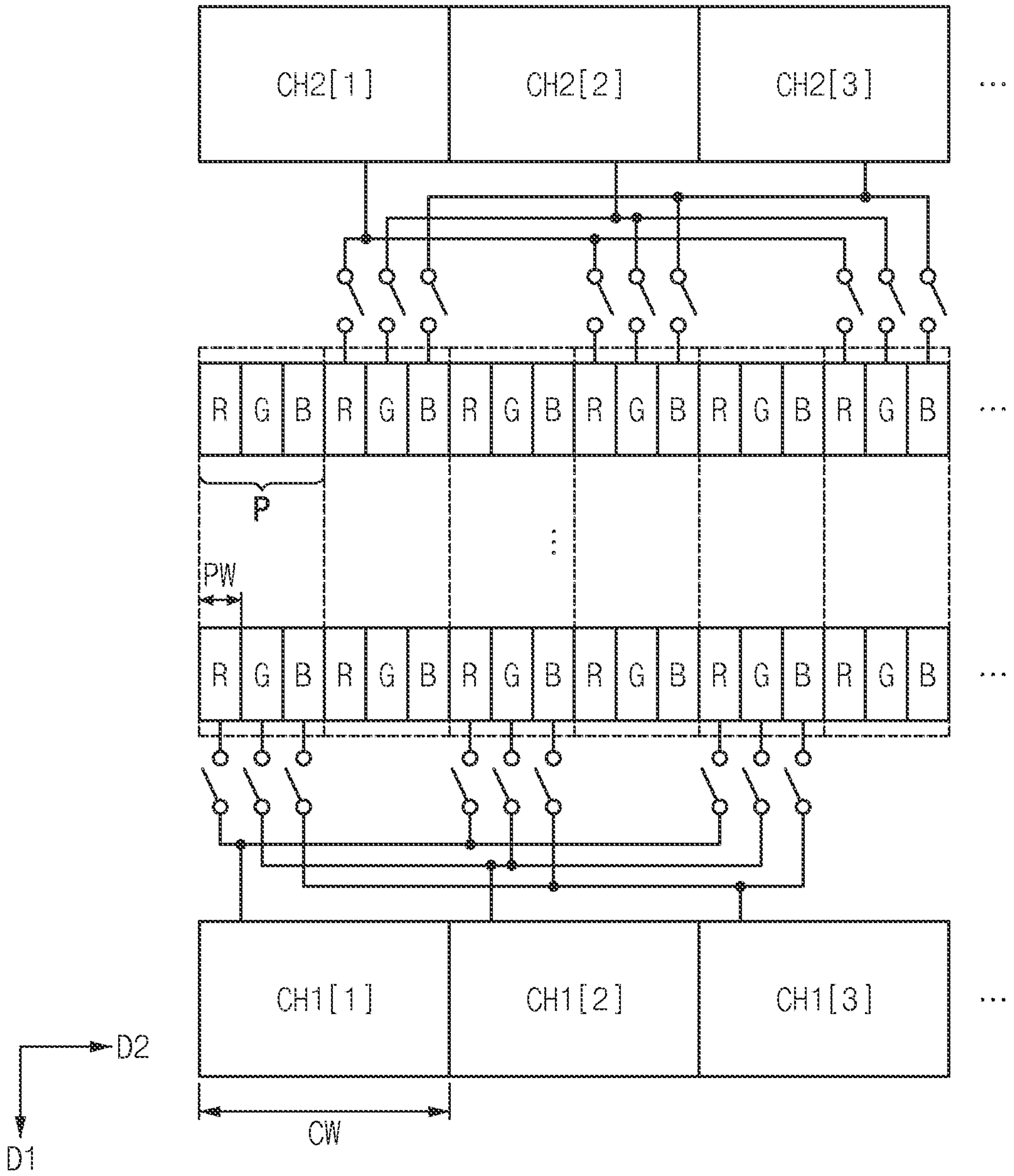
FIG. 4 is a view showing one example in which a data driver of a display device according to embodiments of the disclosure is connected to pixels.
Figure 5:
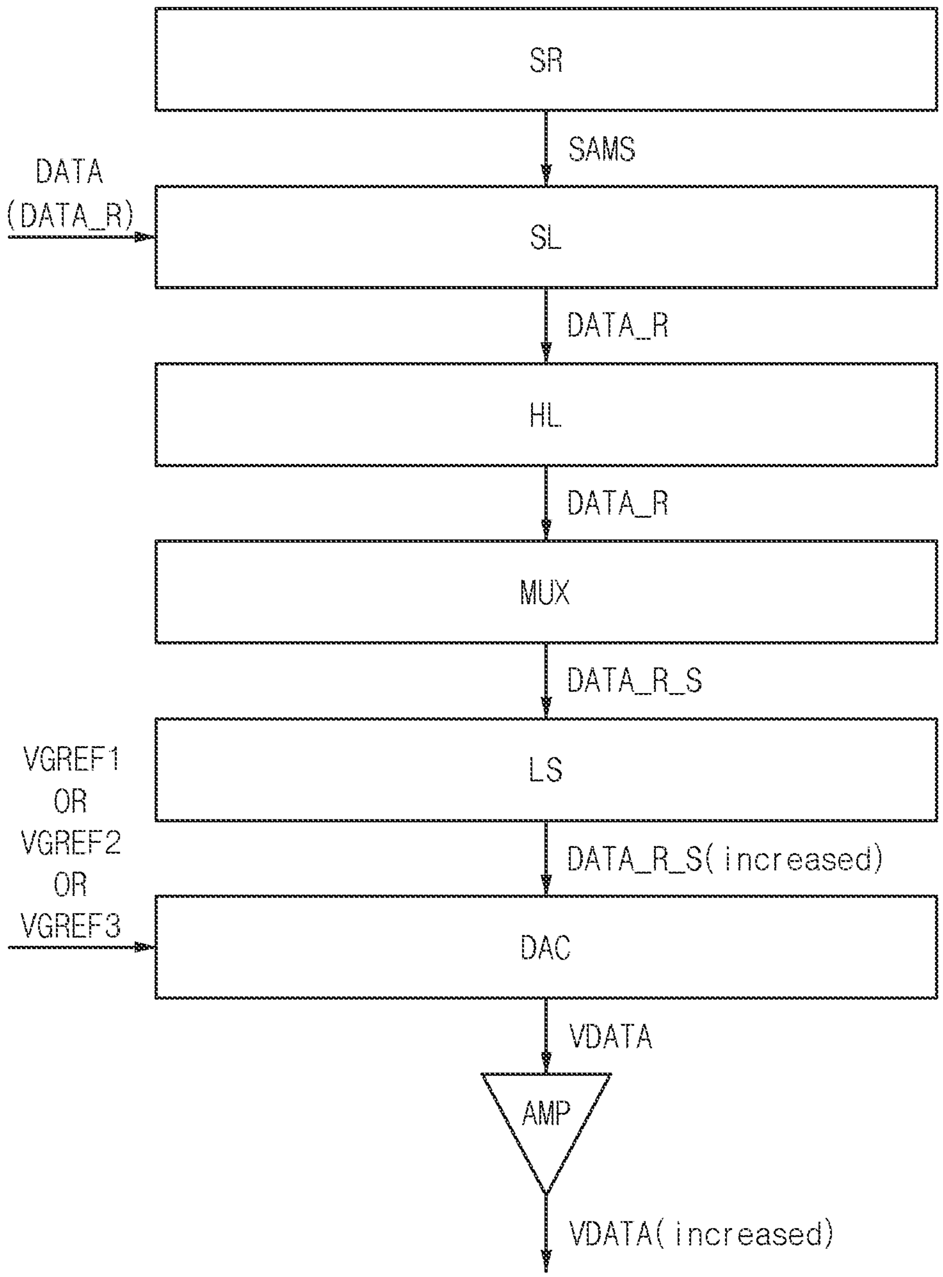
FIG. 5 is a view showing one example of channels of FIG. 4.

FIG. 4 is a view showing one example in which a data driver 400 of a display device according to embodiments of the disclosure is connected to pixels P, and FIG. 5 is a view showing one example of channels CH1[1], CH1[2], CH1[3], . . . , CH2[1], CH2[2], CH2[3], . . . of FIG. 4.

A display device according to an embodiment of FIG. 4 is substantially the same as the embodiment of the display device of FIG. 1 except for connection between the data driver 400 and the pixels P. Accordingly, the same reference numerals and reference signs will be used for the same or similar elements, and any repetitive detailed descriptions thereof will be omitted.

Referring to FIGS. 1 and 4, in an embodiment, at least one (e.g., CH1[1]) of the first channels CH1[1], CH1[2], CH1[3], . . . may be connected to the first color sub-pixel R of each of the pixels P of at least two of the first pixel lines PL1, and at least one (e.g., CH2[1]) of the second channels CH2[1], CH2[2], CH2[3], . . . may be connected to the first color sub-pixel R of each of the pixels P of at least two of the second pixel lines PL2. Here, a pixel may means a pixel row. At least one (e.g., CH1[2]) of the first channels CH1[1], CH1[2], CH1[3], . . . may be connected to the second color sub-pixel G of each of the pixels P of at least two of the first pixel lines PL1, and at least one (e.g., CH2[2]) of the second channels CH2[1], CH2[2], CH2[3], . . . may be connected to the second color sub-pixel G of each of the pixels P of at least two of the second pixel lines PL2. At least one (e.g., CH1[3]) of the first channels CH1[1], CH1[2], CH1[3], . . . may be connected to the third color sub-pixel B of each of the pixels P of at least two of the first pixel lines PL1, and at least one (e.g., CH2[3]) of the second channels CH2[1], CH2[2], CH2[3], . . . may be connected to the third color sub-pixel B of each of the pixels P of at least two of the second pixel lines PL2.

In an embodiment, as shown in FIG. 4, each of the channels CH1[1], CH1[2], CH1[3], . . . , CH2[1], CH2[2], CH2[3], . . . may be connected to three corresponding pixel lines PL1 and PL2, but the disclosure is not limited thereto.

Each of the channels CH1[1], CH1[2], CH1[3], . . . , CH2[1], CH2[2], CH2[3], . . . may selectively apply the data voltages to a plurality of pixel lines PL1 and PL2. In an embodiment, for example, each of the channels (e.g., CH1[1] and CH2[1]) connected to the first color sub-pixels R may sequentially apply the data voltages to the first color sub-pixels R connected in one pixel row. In an embodiment, for example, each of the channels (e.g., CH1[2] and CH2[2]) connected to the second color sub-pixels G may sequentially apply the data voltages to the second color sub-pixels G connected in one pixel row. In an embodiment, for example, each of the channels (e.g., CH1[3] and CH2[3]) connected to the third color sub-pixels B may sequentially apply the data voltages to the third color sub-pixels B connected in one pixel row. However, the disclosure is not limited to an order of applying the data voltages.

Referring to FIGS. 1, 4, and 5, each of the channels CH1[1], CH1[2], CH1[3], . . . , CH2[1], CH2[2], CH2[3], . . . may include a shift register SR, a sampling latch SL, a holding latch HL, a multiplexer MUX, a level shifter LS, a digital-to-analog converter DAC, and a source amplifier AMP.

The multiplexer MUX may select a data signal DATA_R_S corresponding to an applied data voltage VDATA from the data signal DATA_R of the pixel row. In an embodiment, for example, as shown in FIG. 4, one of the channels CH1[1], CH1[2], CH1[3], . . . , CH2[1], CH2[2], CH2[3], . . . may be connected to a plurality of pixel lines PL1 and PL2, and may selectively apply the data voltages VDATA to the connected pixel lines PL1 and PL2. In an embodiment, for example, one of the channels CH1[1], CH1[2], CH1[3], . . . , CH2[1], CH2[2], CH2[3], . . . may sequentially apply the data voltages VDATA to the connected pixel lines PL1 and PL2. Therefore, the multiplexer MUX may select the data signal DATA_R_S corresponding to the data voltage VDATA applied to one of the connected pixel lines PL1 and PL2 from the data signal DATA_R of the pixel to apply the selected data signal DATA_R_S to the level shifter LS.

The digital-to-analog converter DAC may generate the data voltages VDATA applied to the first color sub-pixel R based on a first color gamma reference voltage VGREF1 for the first color. The digital-to-analog converter DAC may generate the data voltages VDATA applied to the second color sub-pixel G based on a second color gamma reference voltage VGREF2 for the second color. The digital-to-analog converter DAC may generate the data voltages VDATA applied to the third color sub-pixel B based on a third color gamma reference voltage VGREF3 for the third color. In other words, the channels (e.g., CH1[1] and CH2[1]) connected to the first color sub-pixel R may receive the first color gamma reference voltage VGREF1, the channels (e.g., CH1[2] and CH2[2]) connected to the second color sub-pixel G may receive the second color gamma reference voltage VGREF2, and the channels (e.g., CH1[3] and CH2[3]) connected to the third color sub-pixel B may receive the third color gamma reference voltage VGREF3.

In an embodiment, for example, the data voltage VDATA for each gray level for the first color may be determined through voltage distribution of the first color gamma reference voltage VGREF1. In an embodiment, for example, the data voltage VDATA for each gray level for the second color may be determined through voltage distribution of the second color gamma reference voltage VGREF2. In an embodiment, for example, the data voltage VDATA for each gray level for the third color may be determined through voltage distribution of the third color gamma reference voltage VGREF3. In such an embodiment, the digital-to-analog converter DAC may generate the data voltages VDATA for all colors R, G, and B based on mutually different gamma reference voltages (i.e., the first to third color gamma reference voltages VGREF1, VGREF2, and VGREF3). Therefore, voltage levels of the data voltages VDATA applied to the first color sub-pixel R, the second color sub-pixel G, and the third color sub-pixel B may be different from each other for a same gray level.

Figure 6:
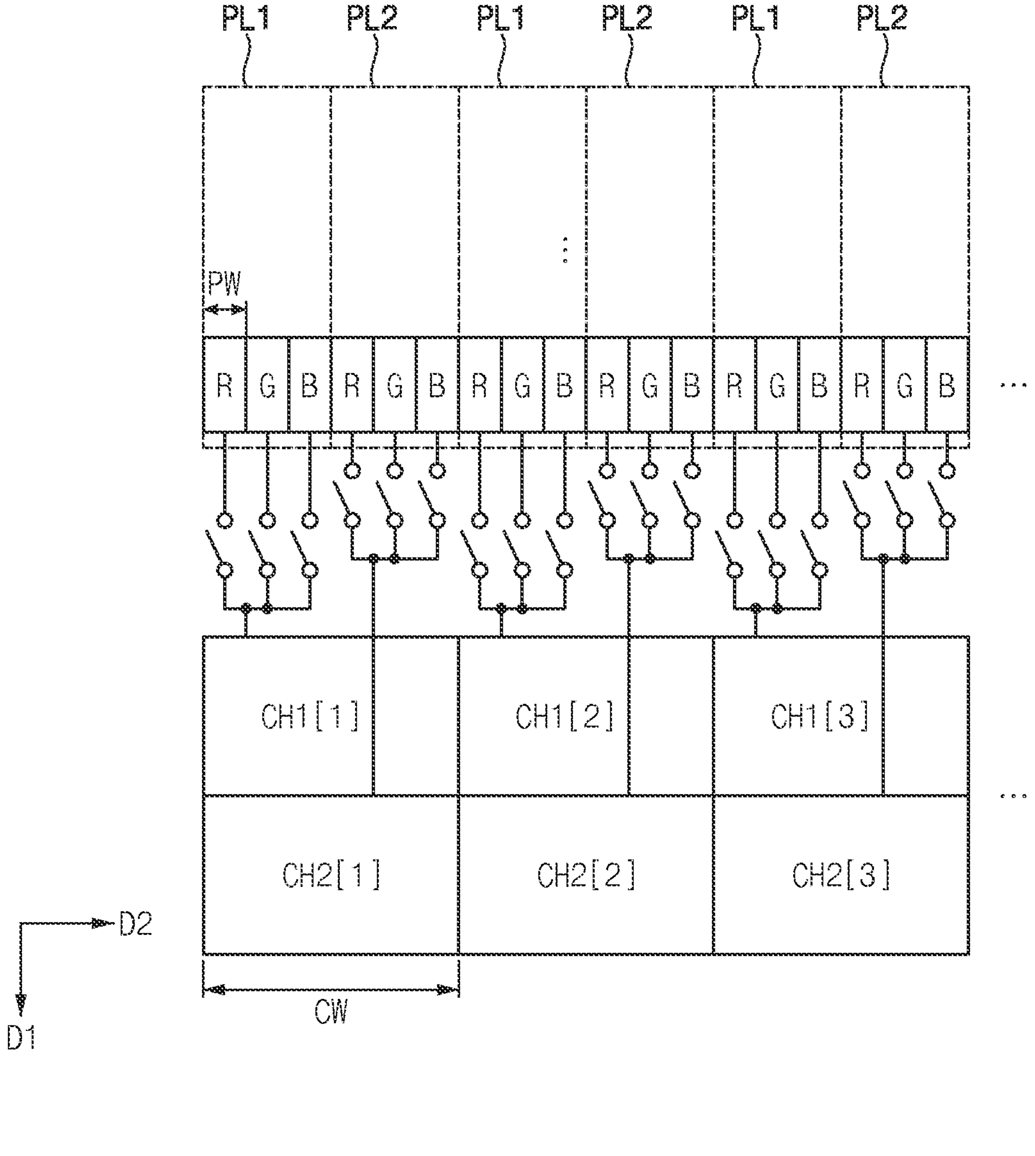
FIG. 6 is a view showing one example in which a data driver of a display device according to embodiments of the disclosure is connected to pixels.

FIG. 6 is a view showing one example in which a data driver 400 of a display device according to embodiments of the disclosure is connected to pixels P.

An embodiment of a display device of FIG. 6 is substantially the same as the embodiment of the display device of FIG. 1 except for an arrangement of the channels CH1[1], CH1[2], CH1[3], . . . , CH2[1], CH2[2], CH2[3], . . . . Accordingly, the same reference numerals and reference signs will be used for the same or similar elements, and any repetitive detailed descriptions thereof will be omitted.

Referring to FIGS. 1 and 6, an embodiment of the data driver 400 may include: first channels CH1[1], CH1[2], CH1[3], . . . configured to apply the data voltages to the pixels P of first pixel lines PL1 among the pixels P, and adjacent to the display panel 100 in a first direction D1; and second channels CH2[1], CH2[2], CH2[3], . . . configured to apply the data voltages to the pixels P of second pixel lines PL2 among the pixels P, and adjacent to the first channels CH1[1], CH1[2], CH1[3], . . . in the first direction D1.

According to an embodiment, the channels CH1[1], CH1[2], CH1[3], . . . , CH2[1], CH2[2], CH2[3], . . . may select the sub-pixels R, G, and B to which the channels CH1[1], CH1[2], CH1[3], . . . , CH2[1], CH2[2], CH2[3], . . . are to be connected through a plurality of switches. The switches configured to select the sub-pixels R, G, and B to which the second channels CH2[1], CH2[2], CH2[3], . . . are connected may be adjacent to the display panel 100 in the first direction D1 further than the first channels CH1[1], CH1[2], CH1[3], . . . . Therefore, wires overlapping the first channels CH1[1], CH1[2], CH1[3], . . . may be minimized.

In an embodiment, as shown in FIG. 6, a channel width CW may be six times a pixel width PW. In such an embodiment, the display device may have a wide channel width CW as compared with a case where one of the channels CH1[1], CH1[2], CH1[3], . . . , CH2[1], CH2[2], CH2[3], . . . is connected to one of the sub-pixels R, G, and B in one pixel row, and the channels CH1[1], CH1[2], CH1[3], . . . , CH2[1], CH2[2], CH2[3], . . . are arranged in a row in the second direction D2. Therefore, the display device may ensure a minimum width to satisfy design rules in design.

Figure 7:
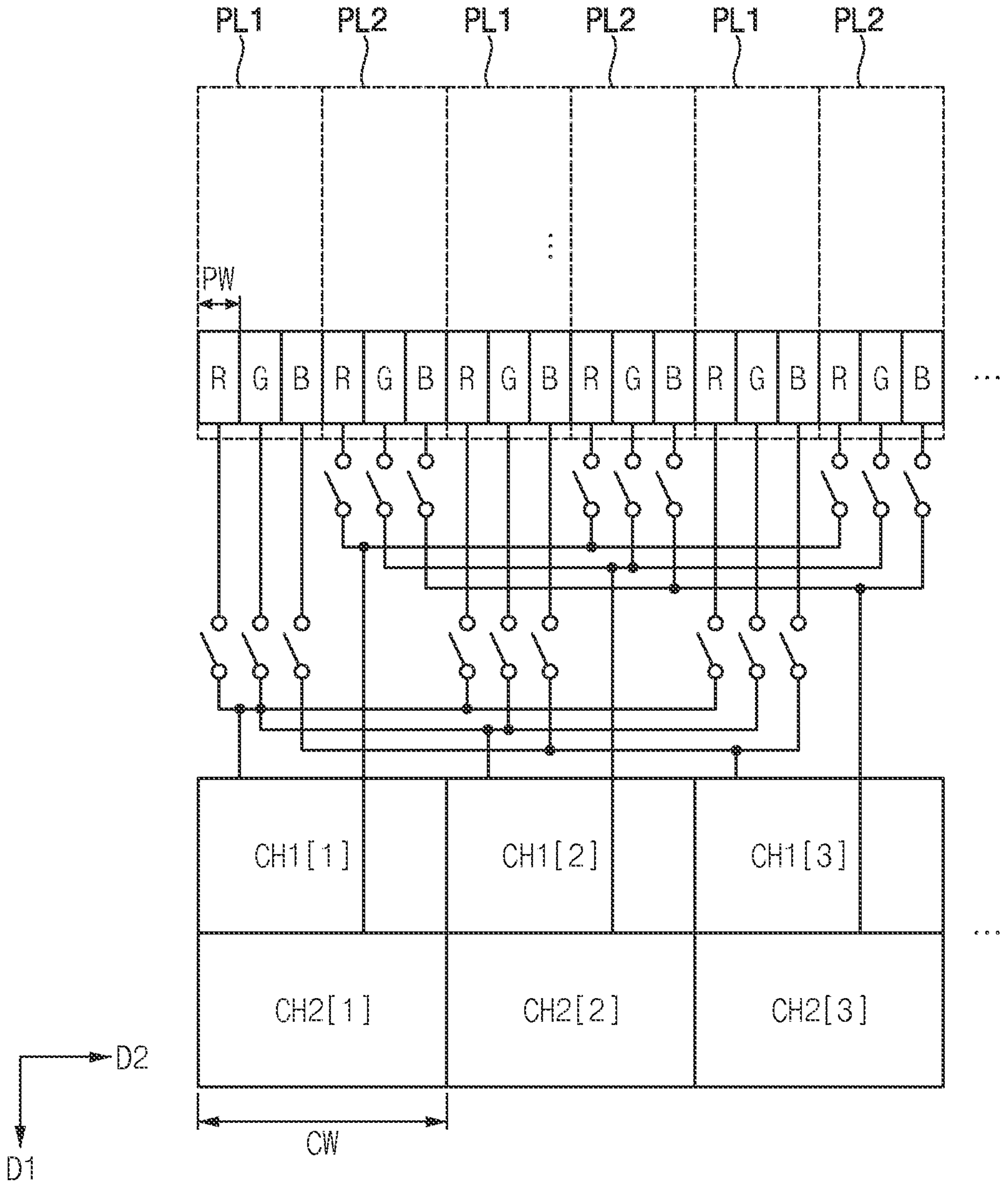
FIG. 7 is a view showing one example in which a data driver of a display device according to embodiments of the disclosure is connected to pixels.

FIG. 7 is a view showing one example in which a data driver 400 of a display device according to embodiments of the disclosure is connected to pixels P.

An embodiment of a display device of FIG. 7 is substantially the same as the embodiment of the display device of FIG. 4 except for an arrangement of the channels CH1[1], CH1[2], CH1[3], . . . , CH2[1], CH2[2], CH2[3], . . . . Accordingly, the same reference numerals and reference signs will be used for the same or similar elements, and any repetitive detailed descriptions thereof will be omitted.

Referring to FIGS. 1 and 7, an embodiment of the data driver 400 may include: first channels CH1[1], CH1[2], CH1[3], . . . configured to apply the data voltages to the pixels P of first pixel lines PL1 among the pixels P, and adjacent to the display panel 100 in a first direction D1; and second channels CH2[1], CH2[2], CH2[3], . . . configured to apply the data voltages to the pixels P of second pixel lines PL2 among the pixels P, and adjacent to the first channels CH1[1], CH1[2], CH1[3], . . . in the first direction D1.

According to an embodiment, the channels CH1[1], CH1[2], CH1[3], . . . , CH2[1], CH2[2], CH2[3], . . . may select the sub-pixels R, G, and B to which the channels CH1[1], CH1[2], CH1[3], . . . , CH2[1], CH2[2], CH2[3], . . . are to be connected through a plurality of switches. The switches configured to select the sub-pixels R, G, and B to which the second channels CH2[1], CH2[2], CH2[3], . . . are connected may be adjacent to the display panel 100 in the first direction D1 further than the first channels CH1[1], CH1[2], CH1[3], . . . . Therefore, wires overlapping the first channels CH1[1], CH1[2], CH1[3], . . . may be minimized.

In an embodiment, as shown in FIG. 7, a channel width CW may be six times a pixel width PW. In such an embodiment, the display device may have a wide channel width CW as compared with a case where one of the channels CH1[1], CH1[2], CH1[3], . . . , CH2[1], CH2[2], CH2[3], . . . is connected to each of the sub-pixels R, G, and B in one pixel row, and the channels CH1[1], CH1[2], CH1[3], . . . , CH2[1], CH2[2], CH2[3], . . . are arranged in a row in the second direction D2. Therefore, the display device may ensure a minimum width to satisfy design rules in design.

Figure 8:
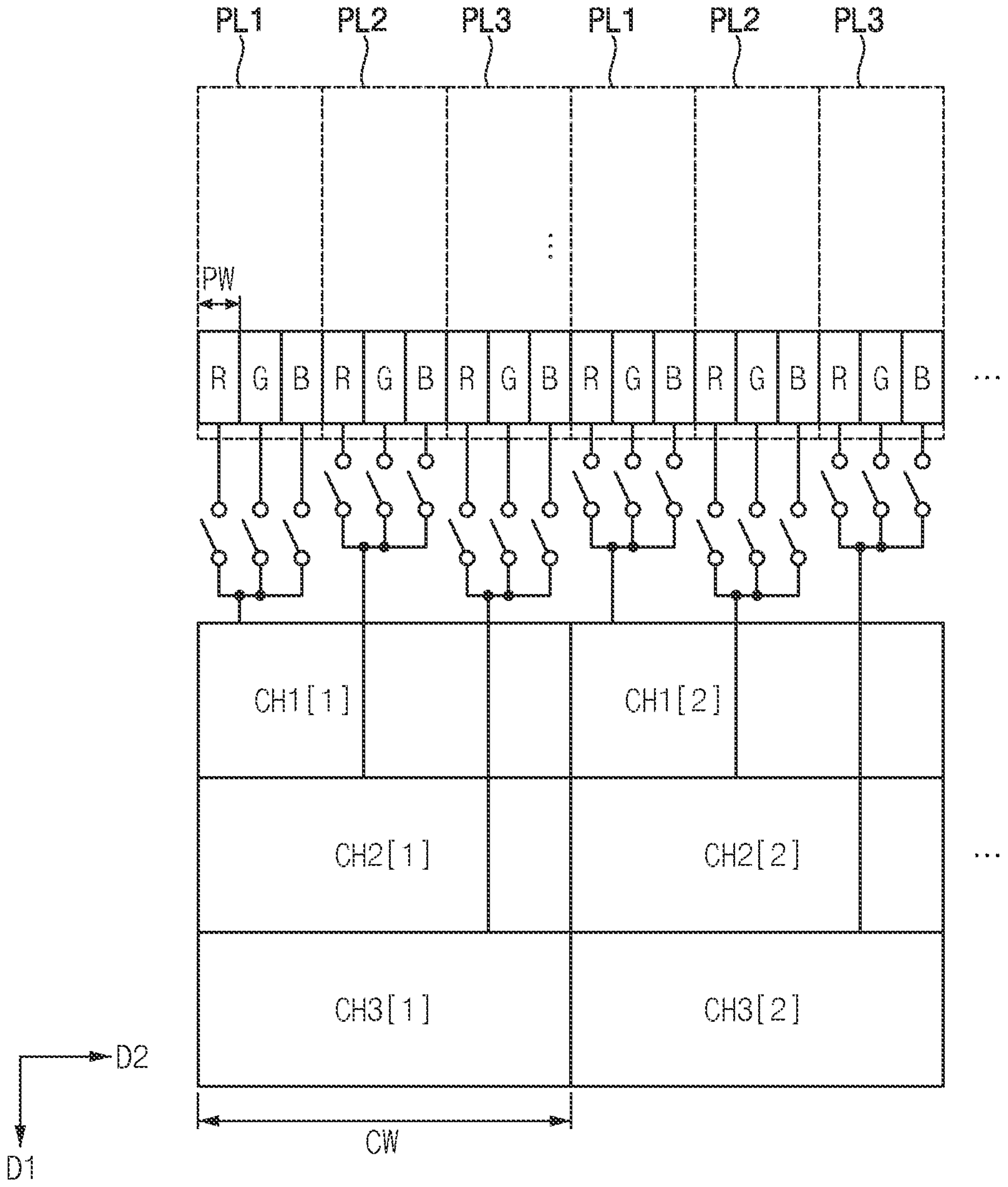
FIG. 8 is a view showing one example in which a data driver of a display device according to embodiments of the disclosure is connected to pixels.

FIG. 8 is a view showing one example in which a data driver 400 of a display device according to embodiments of the disclosure is connected to pixels P.

An embodiment of a display device of FIG. 8 is substantially the same as the embodiment of the display device of FIG. 6 except for third channels CH3[1], CH3[2], . . . and connection between the data driver 400 and the pixels P. Accordingly, the same reference numerals and reference signs will be used for the same or similar elements, and any repetitive detailed descriptions thereof will be omitted.

Referring to FIGS. 1 and 8, an embodiment of the data driver 400 may include: first channels CH1[1], CH1[2], . . . configured to apply the data voltages to the pixels P of first pixel lines PL1 among the pixels P, and adjacent to the display panel 100 in a first direction D1; second channels CH2[1], CH2[2], . . . configured to apply the data voltages to the pixels P of second pixel lines PL2 among the pixels P, and adjacent to the first channels CH1[1], CH1[2], . . . in the first direction D1; and third channels CH3[1], CH3[2], . . . configured to apply the data voltages to the pixels P of third pixel lines PL3 among the pixels P, and adjacent to the second channels CH2[1], CH2[2], . . . in the first direction D1.

At least one of the first pixel lines PL1 may be a $(3N-2)^{th}$ pixel line, at least one of the second pixel lines PL2 may be a $(3N-1)^{th}$ pixel line, and at least one of the third pixel lines PL3 may be a $3N^{th}$ pixel line. An order of the pixel lines PL1, PL2, and PL3 may be defined in a second direction D2.

According to an embodiment, the first pixel lines PL1 may be $(3N-2)^{th}$ pixel lines, the second pixel lines PL2 may be $(3N-1)^{th}$ pixel lines, and the third pixel lines PL3 may be $3N^{th}$ pixel lines.

Each of the first channels CH1[1], CH1[2], . . . may be connected to the sub-pixels R, G, and B of the pixels P of a corresponding one of the first pixel lines PL1, each of the second channels CH2[1], CH2[2], . . . may be connected to the sub-pixels R, G, and B of the pixels P of a corresponding one of the second pixel lines PL2, and each of the third channels CH3[1], CH3[2], . . . may be connected to the sub-pixels R, G, and B of the pixels P of a corresponding one of the third pixel lines PL3.

Each of the channels CH1[1], CH1[2], . . . , CH2[1], CH2[2], . . . , CH3[1], CH3[2], . . . may selectively apply the data voltages to the sub-pixels R, G, and B. In an embodiment, for example, each of the channels CH1[1], CH1[2], . . . , CH2[1], CH2[2], . . . , CH3[1], CH3[2], . . . may sequentially apply the data voltages to the first color sub-pixels R, the second color sub-pixels G, and the third color sub-pixels B. However, the disclosure is not limited to an order of applying the data voltages.

According to an embodiment, the channels CH1[1], CH1[2], . . . , CH2[1], CH2[2], . . . , CH3[1], CH3[2], . . . may select the sub-pixels R, G, and B to which the channels CH1[1], CH1[2], . . . , CH2[1], CH2[2], . . . , CH3[1], CH3[2], . . . are to be connected through a plurality of switches. The switches configured to select the sub-pixels R, G, and B to which the second channels CH2[1], CH2[2], . . . are connected may be adjacent to the display panel 100 in the first direction D1 further than the first channels CH1[1], CH1[2], . . . . The switches for configured to select the sub-pixels R, G, and B to which the third channels CH3[1], CH3[2], . . . are connected may be adjacent to the display panel 100 in the first direction D1 further than the first channels CH1[1], CH1[2] Therefore, wires overlapping the first channels CH1[1], CH1[2], . . . may be minimized.

In an embodiment, as shown in FIG. 8, a channel width CW may be nine times a pixel width PW. In such an embodiment, the display device may have a wide channel width CW as compared with a case where one of the channels CH1[1], CH1[2], . . . , CH2[1], CH2[2], . . . , CH3[1], CH3[2], . . . is connected to each of the sub-pixels R, G, and B in one pixel row, and the channels CH1[1], CH1[2], . . . , CH2[1], CH2[2], . . . , CH3[1], CH3[2], . . . are arranged in a row in the second direction D2. Therefore, the display device may ensure a minimum width to satisfy design rules in design.

Figure 9:
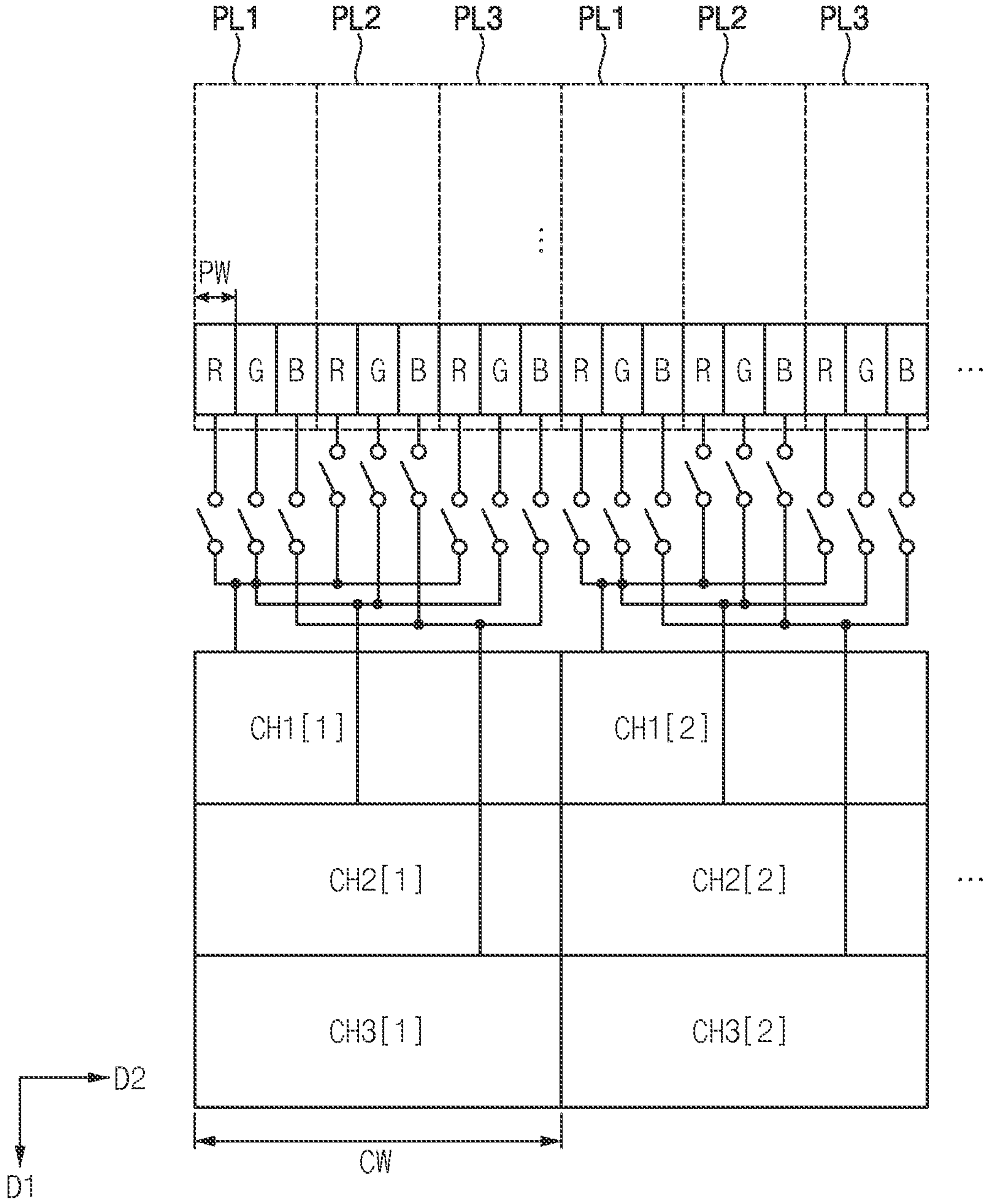
FIG. 9 is a view showing one example in which a data driver of a display device according to embodiments of the disclosure is connected to pixels.

FIG. 9 is a view showing one example in which a data driver 400 of a display device according to embodiments of the disclosure is connected to pixels P.

An embodiment of a display device of FIG. 9 is substantially the same as the embodiment of the display device of FIG. 7 except for third channels CH3[1], CH3[2], . . . and connection between the data driver 400 and the pixels P. Accordingly, the same reference numerals and reference signs will be used for the same or similar elements, and any repetitive detailed descriptions thereof will be omitted.

Referring to FIGS. 1 and 9, an embodiment of the data driver 400 may include: first channels CH1[1], CH1[2], . . . configured to apply the data voltages to the pixels P of first pixel lines PL1 among the pixels P, and adjacent to the display panel 100 in a first direction D1; second channels CH2[1], CH2[2], . . . configured to apply the data voltages to the pixels P of second pixel lines PL2 among the pixels P, and adjacent to the first channels CH1[1], CH1[2], . . . in the first direction D1; and third channels CH3[1], CH3[2], . . . configured to apply the data voltages to the pixels P of third pixel lines PL3 among the pixels P, and adjacent to the second channels CH2[1], CH2[2], . . . in the first direction D1.

At least one of the first pixel lines PL1 may be a $(3N-2)^{th}$ pixel line, at least one of the second pixel lines PL2 may be a $(3N-1)^{th}$ pixel line, and at least one of the third pixel lines PL3 may be a $3N^{th}$ pixel line. An order of the pixel lines PL1, PL2, and PL3 may be defined in a second direction D2.

According to an embodiment, the first pixel lines PL1 may be $(3N-2)^{th}$ pixel lines, the second pixel lines PL2 may be $(3N-1)^{th}$ pixel lines, and the third pixel lines PL3 may be $3N^{th}$ pixel lines.

At least one of the first channels CH1[1], CH1[2], . . . may be connected to the first color sub-pixel R of each of the pixels P of at least one of the first pixel lines PL1, the first color sub-pixel R of each of the pixels P of at least one of the second pixel lines PL2, and the first color sub-pixel R of each of the pixels P of at least one of the third pixel lines PL3; at least one of the second channels CH2[1], CH2[2], . . . may be connected to the second color sub-pixel G of each of the pixels P of at least one of the first pixel lines PL1, the second color sub-pixel G of each of the pixels P of at least one of the second pixel lines PL2, and the second color sub-pixel G of each of the pixels P of at least one of the third pixel lines PL3; and at least one of the third channels CH3[1], CH3[2], . . . may be connected to the third color sub-pixel B of each of the pixels P of at least one of the first pixel lines PL1, the third color sub-pixel B of each of the pixels P of at least one of the second pixel lines PL2, and the third color sub-pixel B of each of the pixels P of at least one of the third pixel lines PL3.

According to an embodiment, the first channels CH1[1], CH1[2], . . . may be connected to the first color sub-pixels R of a plurality of pixel lines PL1, PL2, and PL3, the second channels CH2[1], CH2[2], . . . may be connected to the second color sub-pixels G of the pixel lines PL1, PL2, and PL3, and the third channels CH3[1], CH3[2], . . . may be connected to the third color sub-pixels B of the pixel lines PL1, PL2, and PL3.

According to an embodiment, the channels CH1[1], CH1[2], . . . , CH2[1], CH2[2], . . . , CH3[1], CH3[2], . . . may select the sub-pixels R, G, and B to which the channels CH1[1], CH1[2], . . . , CH2[1], CH2[2], . . . , CH3[1], CH3[2], . . . are to be connected through a plurality of switches. The switches configured to select the sub-pixels R, G, and B to which the second channels CH2[1], CH2[2], . . . are connected may be adjacent to the display panel 100 in the first direction D1 further than the first channels CH1[1], CH1[2], . . . . The switches for configured to select the sub-pixels R, G, and B to which the third channels CH3[1], CH3[2], . . . are connected may be adjacent to the display panel 100 in the first direction D1 further than the first channels CH1[1], CH1[2], . . . . Therefore, wires overlapping the first channels CH1[1], CH1[2], . . . may be minimized.

In an embodiment, as shown in FIG. 9, a channel width CW may be nine times a pixel width PW. In such an embodiment, the display device may have a wide channel width CW as compared with a case where one of the channels CH1[1], CH1[2], . . . , CH2[1], CH2[2], . . . , CH3[1], CH3[2], . . . is connected to each of the sub-pixels R, G, and B in one pixel row, and the channels CH1[1], CH1[2], . . . , CH2[1], CH2[2], . . . , CH3[1], CH3[2], . . . are arranged in a row in the second direction D2. Therefore, the display device may ensure a minimum width to satisfy design rules in design.

Figure 10:
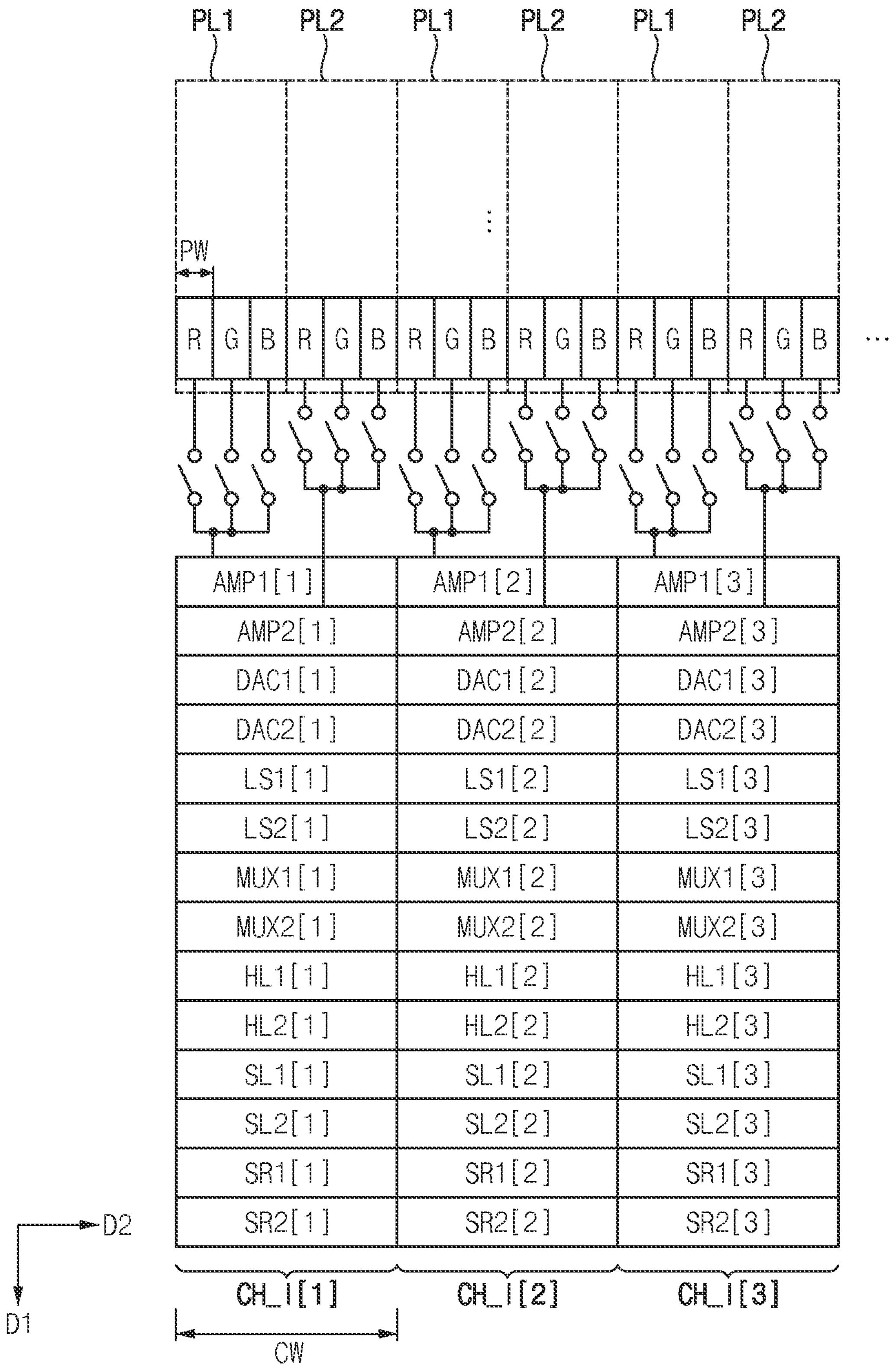
FIG. 10 is a view showing one example in which a data driver of a display device according to embodiments of the disclosure is connected to pixels.

FIG. 10 is a view showing one example in which a data driver 400 of a display device according to embodiments of the disclosure is connected to pixels P.

An embodiment of a display device of FIG. 10 is substantially the same as the embodiment of the display device of FIG. 6 except for integrated channels CH_I[1], CH_I[2], CH_I[3], . . . . Accordingly, the same reference numerals and reference signs will be used for the same or similar elements, and any repetitive detailed descriptions thereof will be omitted. Referring to FIGS. 1 and 10, an embodiment of the data driver 400 may include integrated channels CH_I[1], CH_I[2], CH_I[3], . . . including first source amplifiers AMP1[1], AMP1[2], AMP1[3], . . . configured to apply the data voltages to the pixels P of a first pixel line PL1 among the pixels P and adjacent to the display panel 100 in a first direction D1, and second source amplifiers AMP2[1], AMP2[2], AMP2[3], . . . configured to apply the data voltages to the pixels P of a second pixel line PL2 among the pixels P and adjacent to the first source amplifiers AMP1[1], AMP1[2], AMP1[3], . . . in the first direction D1.

The integrated channels CH_I[1], CH_I[2], CH_I[3], . . . may include: first digital-to-analog converters DAC1[1], DAC1[2], DAC1[3], . . . configured to apply the data voltages to the first source amplifiers AMP1[1], AMP1[2], AMP1[3], . . . , and adjacent to the second source amplifiers AMP2[1], AMP2[2], AMP2[3], . . . in the first direction D1; and second digital-to-analog converters DAC2[1], DAC2[2], DAC2[3], . . . configured to apply the data voltages to the second source amplifiers AMP2[1], AMP2[2], AMP2[3], . . . , and adjacent to the first digital-to-analog converters DAC1[1], DAC1[2], DAC1[3], . . . in the first direction D1.

The integrated channels CH_I[1], CH_I[2], CH_I[3], . . . may include: first level shifters LS1[1], LS1[2], LS1[3], . . . configured to apply data signals corresponding to the data voltages applied to the first digital-to-analog converters DAC1[1], DAC1[2], DAC1[3], . . . , and adjacent to the second digital-to-analog converters DAC2[1], DAC2 [2], DAC2[3], . . . in the first direction D1; and second level shifters LS2[1], LS2[2], LS2[3], . . . configured to apply data signals corresponding to the data voltages applied to the second digital-to-analog converters DAC2[1], DAC2[2], DAC2[3], . . . , and adjacent to the first level shifters LS1[1], LS1[2], LS1[3], . . . in the first direction D1.

The integrated channels CH_I[1], CH_I[2], CH_I[3], . . . may include: first multiplexers MUX1[1], MUX1[2], MUX1[3], . . . configured to apply the data signals corresponding to the data voltages applied to the first level shifters LS1[1], LS1[2], LS1[3], . . . , and adjacent to the second level shifters LS2[1], LS2[2], LS2[3], . . . in the first direction D1; and second multiplexers MUX2[1], MUX2[2], MUX2[3], . . . configured to apply the data signals corresponding to the data voltages applied to the second level shifters LS2[1], LS2[2], LS2[3], . . . , and adjacent to the first multiplexers MUX1[1], MUX1[2], MUX1[3], . . . in the first direction D1.

The integrated channels CH_I[1], CH_I[2], CH_I[3], . . . may include: first holding latches HL1[1], HL1[2], HL1[3], . . . configured to apply data signals of a pixel row to the first multiplexers MUX1[1], MUX1[2], MUX1[3], . . . , and adjacent to the second multiplexers MUX2[1], MUX2[2], MUX2[3], . . . in the first direction D1; and second holding latches HL2[1], HL2[2], HL2[3], . . . configured to apply data signals of a pixel row to the second multiplexers MUX2[1], MUX2[2], MUX2[3], . . . , and adjacent to the first holding latches HL1[1], HL1[2], HL1[3], . . . in the first direction D1.

The integrated channels CH_I[1], CH_I[2], CH_I[3], . . . may include: first sampling latches SL1[1], SL1[2], SL1[3], . . . configured to apply the data signals of the pixel row to the first holding latches HL1[1], HL1[2], HL1[3], . . . , and adjacent to the second holding latches HL2[1], HL2[2], HL2[3], . . . in the first direction D1; and second sampling latches SL2[1], SL2[2], SL2[3], . . . configured to apply the data signals of the pixel row to the second holding latches HL2[1], HL2[2], HL2[3], . . . , and adjacent to the first sampling latches SL1[1], SL1[2], SL1 [3], . . . in the first direction D1.

The integrated channels CH_I[1], CH_I[2], CH_I[3], . . . may include: first shift registers SR1[1], SR1[2], SR1[3], . . . configured to apply sampling signals to the first sampling latches SL1[1], SL1[2], SL1[3], . . . , and adjacent to the second sampling latches SL2[1], SL2[2], SL2[3], . . . in the first direction D1; and second shift registers SR2[1], SR2[2], SR2[3], . . . configured to apply sampling signals to the second sampling latches SL2[1], SL2[2], SL2[3], . . . , and adjacent to the first shift registers SR1[1], SR1[2], SR1[3], . . . in the first direction D1.

Figure 11:
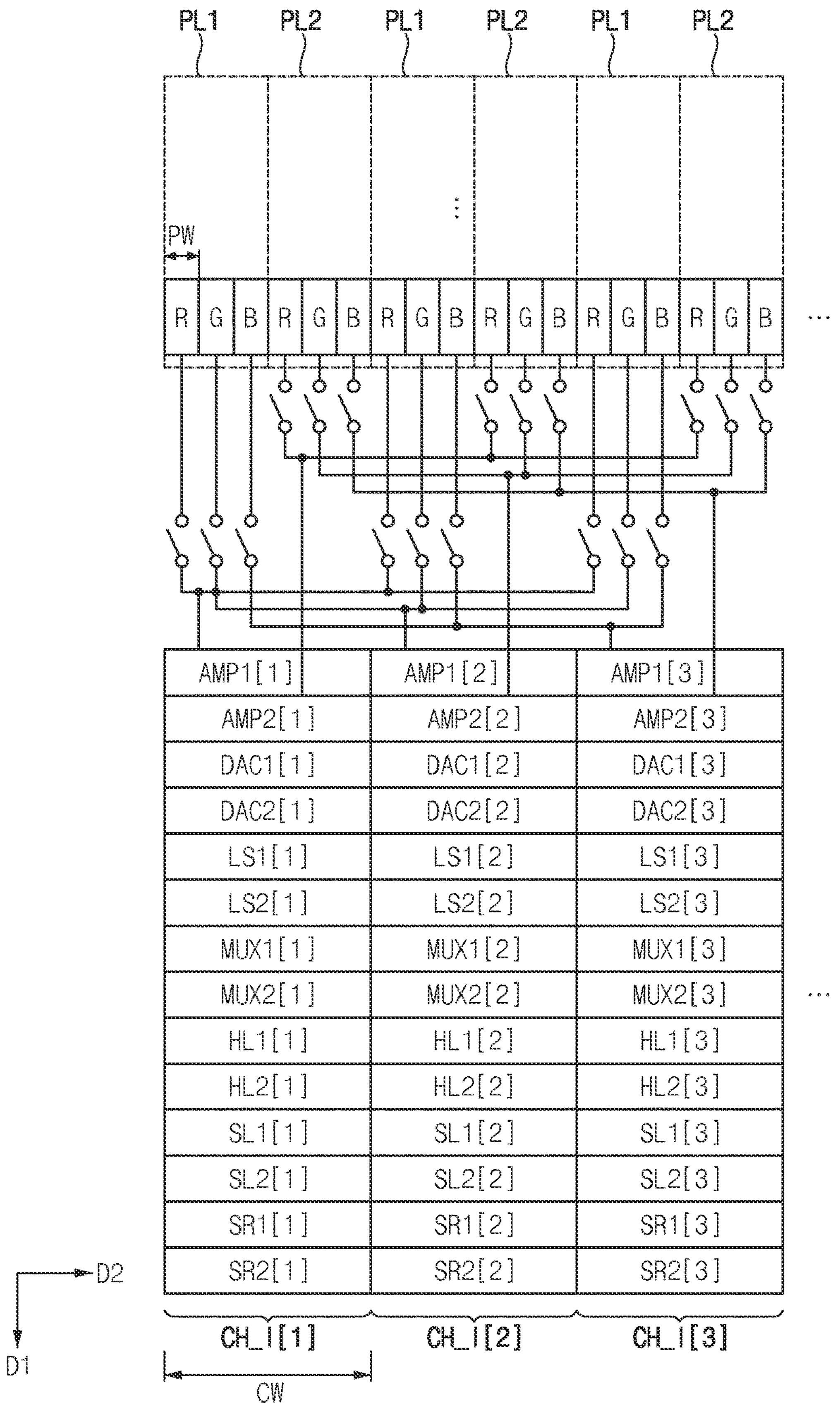
FIG. 11 is a view showing one example in which a data driver of a display device according to embodiments of the disclosure is connected to pixels.

FIG. 11 is a view showing one example in which a data driver 400 of a display device according to embodiments of the disclosure is connected to pixels P.

An embodiment of a display device of FIG. 11 is substantially the same as the embodiment of the display device of FIG. 7 except for integrated channels CH_I[1], CH_I[2], CH_I[3], . . . . Accordingly, the same reference numerals and reference signs will be used for the same or similar elements, and any repetitive detailed descriptions thereof will be omitted.

Referring to FIG. 11, an embodiment of the data driver 400 may include integrated channels CH_I[1], CH_I[2], CH_I[3], . . . including first and second source amplifiers AMP1[1], AMP1[2], AMP1[3], . . . , AMP2[1], AMP2[2], AMP2[3], . . . , first and second digital-to-analog converters DAC1[1], DAC1[2], DAC1[3], . . . , DAC2[1], DAC2[2], DAC2[3], . . . , first and second level shifters LS1[1], LS1[2], LS1[3], . . . , LS2[1], LS2[2], LS2[3], . . . , first and second multiplexers MUX1[1], MUX1[2], MUX1[3], MUX2[1], MUX2[2], MUX2[3], . . . , first and second holding latches HL1[1], HL1[2], HL1[3], HL2[1], HL2[2], HL2[3], . . . , first and second sampling latches SL1[1], SL1[2], SL1[3], . . . , SL2[1], SL2[2], SL2[3], . . . , and first and second shift registers SR1[1], SR1[2], SR1[3], SR2[1], SR2[2], SR2[3], In such an embodiment, the elements listed above are substantially the same as those described with reference to FIG. 10, and any repetitive detailed descriptions thereof will be omitted.

Figure 12:
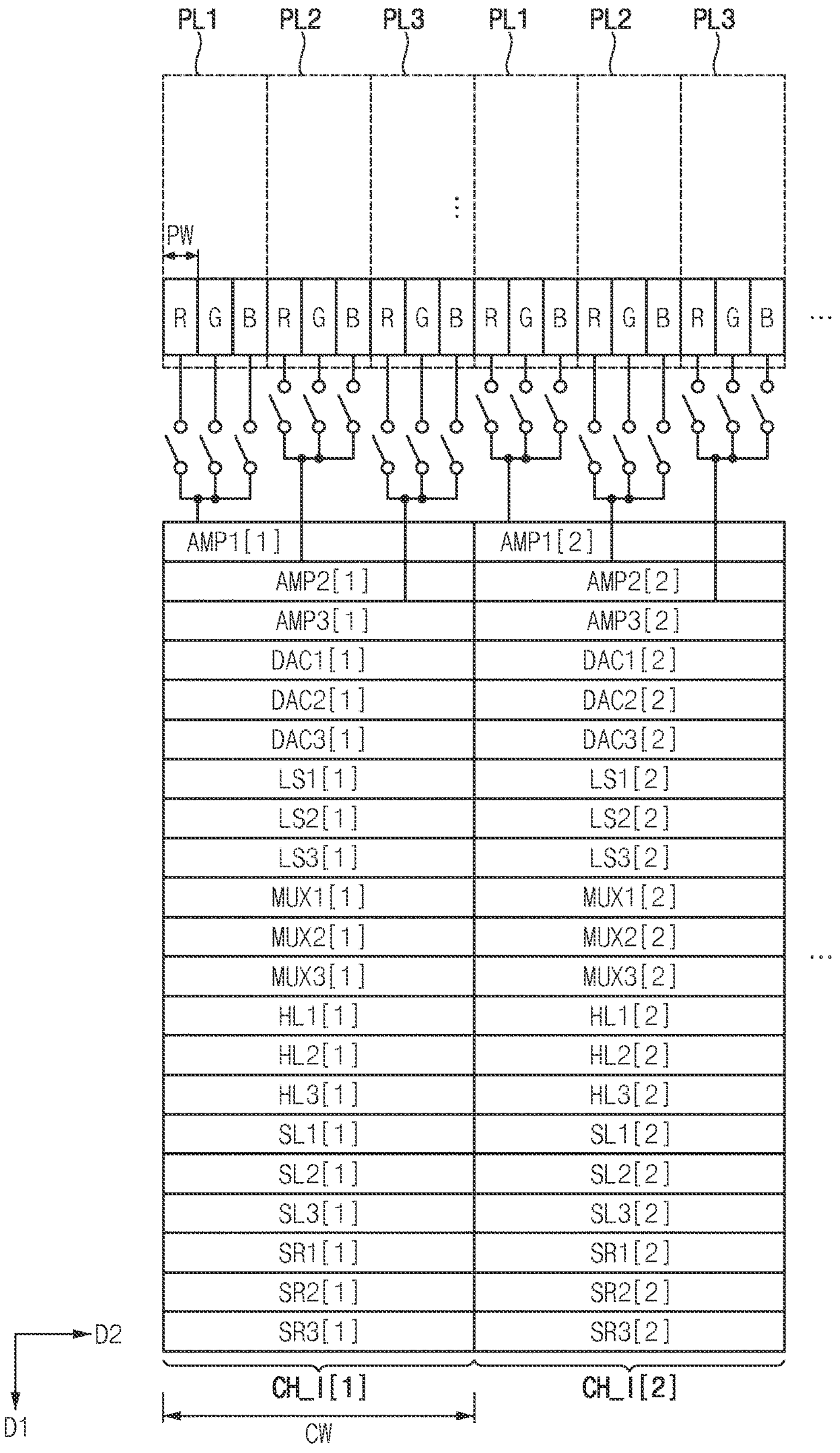
FIG. 12 is a view showing one example in which a data driver of a display device according to embodiments of the disclosure is connected to pixels.

FIG. 12 is a view showing one example in which a data driver 400 of a display device according to embodiments of the disclosure is connected to pixels P.

An embodiment of a display device of FIG. 12 is substantially the same as the embodiment of the display device of FIG. 8 except for integrated channels CH_I[1], CH_I[2], . . . . Accordingly, the same reference numerals and reference signs will be used for the same or similar elements, and any repetitive detailed descriptions thereof will be omitted.

Referring to FIGS. 1 and 12, an embodiment of the data driver 400 may include integrated channels CH_I[1], CH_I [2], . . . including first source amplifiers AMP1[1], AMP1[2], . . . configured to apply the data voltages to the pixels P of a first pixel line PL1 among the pixels P and adjacent to the display panel 100 in a first direction D1, second source amplifiers AMP2[1], AMP2[2], . . . configured to apply the data voltages to the pixels P of a second pixel line PL2 among the pixels P and adjacent to the first source amplifiers AMP1[1], AMP1[2], . . . in the first direction D1, and third source amplifiers AMP3[1], AMP3 [2], . . . configured to apply the data voltages to the pixels P of a third pixel line PL3 among the pixels P and adjacent to the second source amplifiers AMP2[1], AMP2[2], . . . in the first direction D1.

The integrated channels CH_I[1], CH_I[2], . . . may include: first digital-to-analog converters DAC1[1], DAC1 [2], . . . configured to apply the data voltages to the first source amplifiers AMP1[1], AMP1[2], . . . , and adjacent to the third source amplifiers AMP3[1], AMP3[2], . . . in the first direction D1; second digital-to-analog converters DAC2[1], DAC2[2], . . . configured to apply the data voltages to the second source amplifiers AMP2[1], AMP2 [2], . . . , and adjacent to the first digital-to-analog converters DAC1[1], DAC1[2], . . . in the first direction D1; and third digital-to-analog converters DAC3[1], DAC3[2], . . . configured to apply the data voltages to the third source amplifiers AMP3[1], AMP3[2], . . . , and adjacent to the second digital-to-analog converters DAC2[1], DAC2[2], . . . in the first direction D1.

The integrated channels CH_I[1], CH_I[2], . . . may include: first level shifters LS1[1], LS1[2], . . . configured to apply data signals corresponding to the data voltages applied to the first digital-to-analog converters DAC1[1], DAC1[2], . . . , and adjacent to the third digital-to-analog converters DAC3[1], DAC3[2], . . . in the first direction D1; second level shifters LS2[1], LS2[2], . . . configured to apply data signals corresponding to the data voltages applied to the second digital-to-analog converters DAC2[1], DAC2[2], . . . , and adjacent to the first level shifters LS1[1], LS1[2], . . . in the first direction D1; and third level shifters LS3[1], LS3[2], . . . configured to apply data signals corresponding to the data voltages applied to the third digital-to-analog converters DAC3[1], DAC3[2], . . . , and adjacent to the second level shifters LS2[1], LS2[2], . . . in the first direction D1.

The integrated channels CH_I[1], CH_I[2], . . . may include: first multiplexers MUX1[1], MUX1[2], . . . configured to apply the data signals corresponding to the data voltages applied to the first level shifters LS1[1], LS1[2], . . . , and adjacent to the third level shifters LS3[1], LS3[2], . . . in the first direction D1; second multiplexers MUX2[1], MUX2[2], . . . configured to apply the data signals corresponding to the data voltages applied to the second level shifters LS2[1], LS2[2], . . . , and adjacent to the first multiplexers MUX1[1], MUX1[2], . . . in the first direction D1; and third multiplexers MUX3[1], MUX3[2], . . . configured to apply the data signals corresponding to the data voltages applied to the third level shifters LS3[1], LS3[2], . . . , and adjacent to the second multiplexers MUX2[1], MUX2[2], . . . in the first direction D1.

The integrated channels CH_I[1], CH_I[2], . . . may include: first holding latches HL1[1], HL1[2], . . . configured to apply data signals of a pixel row to the first multiplexers MUX1[1], MUX1[2], . . . , and adjacent to the third multiplexers MUX3[1], MUX3[2], . . . in the first direction D1; second holding latches HL2[1], HL2[2], . . . configured to apply data signals of a pixel row to the second multiplexers MUX2[1], MUX2[2], . . . , and adjacent to the first holding latches HL1[1], HL1[2], . . . in the first direction D1; and third holding latches HL3[1], HL3[2], . . . configured to apply data signals of a pixel row to the third multiplexers MUX3[1], MUX3[2], . . . , and adjacent to the second holding latches HL2[1], HL2[2], . . . in the first direction D1.

The integrated channels CH_I[1], CH_I[2], . . . may include: first sampling latches SL1[1], SL1[2], . . . configured to apply the data signals of the pixel row to the first holding latches HL1[1], HL1[2], . . . , and adjacent to the third holding latches HL3[1], HL3[2], . . . in the first direction D1; second sampling latches SL2[1], SL2[2], . . . configured to apply the data signals of the pixel row to the second holding latches HL2[1], HL2[2], . . . , and adjacent to the first sampling latches SL1[1], SL1[2], . . . in the first direction D1; and third sampling latches SL3[1], SL3[2], . . . configured to apply the data signals of the pixel row to the third holding latches HL3[1], HL3[2], . . . , and adjacent to the second sampling latches SL2[1], SL2[2], . . . in the first direction D1.

The integrated channels CH_I[1], CH_I[2], . . . may include: first shift registers SR1[1], SR1[2], . . . configured to apply sampling signals to the first sampling latches SL1[1], SL1[2], . . . , and adjacent to the third sampling latches SL3[1], SL3[2], . . . in the first direction D1; second shift registers SR2[1], SR2[2], . . . configured to apply sampling signals to the second sampling latches SL2[1], SL2[2], . . . , and adjacent to the first shift registers SR1[1], SR1[2], . . . in the first direction D1; and third shift registers SR3[1], SR3[2], . . . configured to apply sampling signals to the third sampling latches SL3[1], SL3[2], . . . , and adjacent to the second shift registers SR2[1], SR2[2], . . . in the first direction D1.

Figure 13:
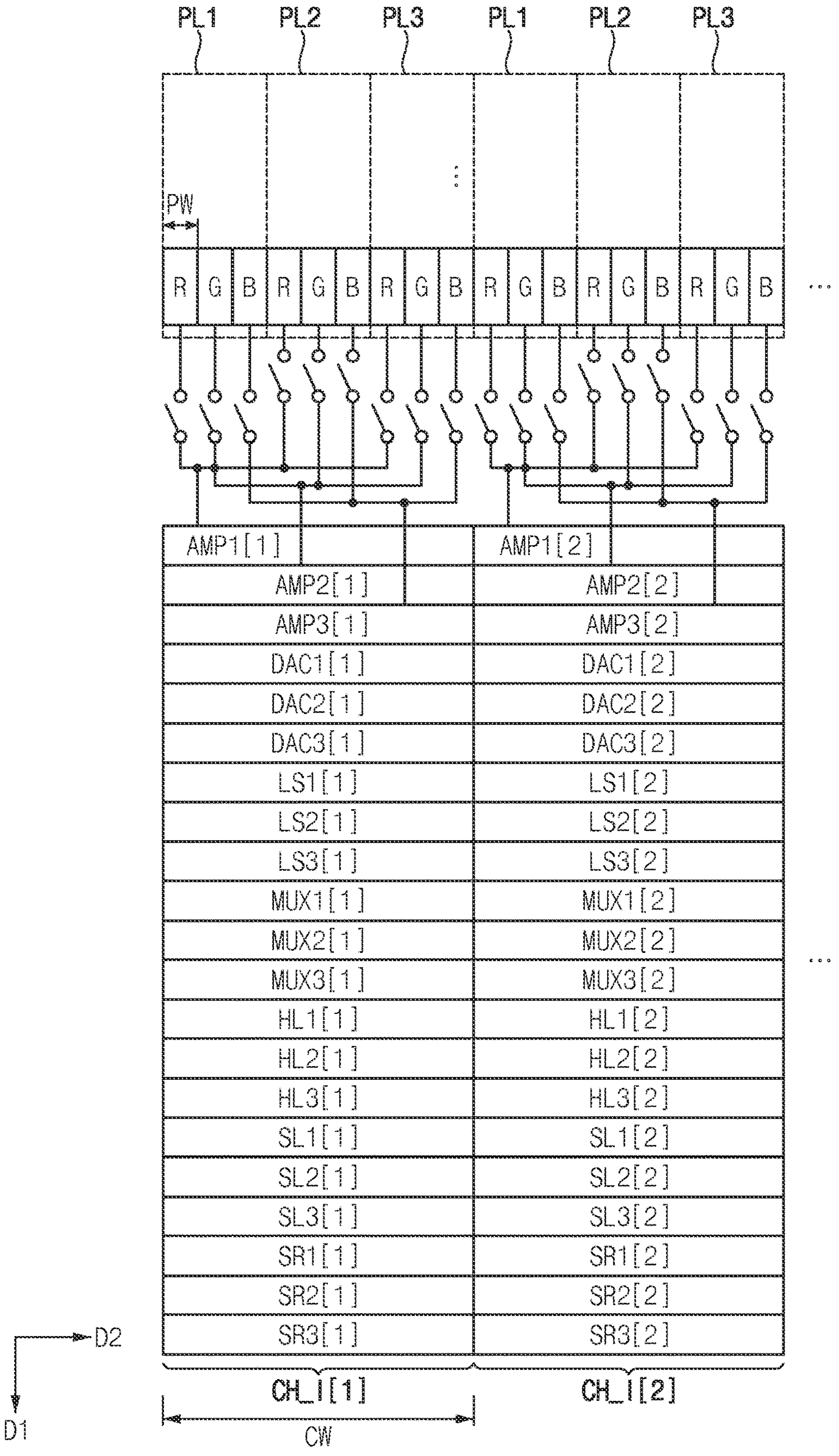
FIG. 13 is a view showing one example in which a data driver of a display device according to embodiments of the disclosure is connected to pixels.

FIG. 13 is a view showing one example in which a data driver 400 of a display device according to embodiments of the disclosure is connected to pixels P.

An embodiment of a display device of FIG. 12 is substantially the same as the embodiment of the display device of FIG. 9 except for integrated channels CH_I[1], CH_I[2], . . . . Accordingly, the same reference numerals and reference signs will be used for the same or similar elements, and any repetitive detailed descriptions thereof will be omitted.

Referring to FIG. 13, an embodiment of the data driver 400 may include integrated channels CH_I[1], CH_I[2], . . . including first to third source amplifiers AMP1[1], AMP1[2], . . . , AMP2[1], AMP2[2], AMP3[1], AMP3[2], . . . , first to third digital-to-analog converters DAC1[1], DAC1[2], DAC2[1], DAC2[2], DAC3[1], DAC3[2], . . . , first to third level shifters LS1[1], LS1[2], . . . , LS2[1], LS2[2], . . . , LS3[1], LS3[2], . . . , first to third multiplexers MUX1[1], MUX1[2], . . . , MUX2[1], MUX2[2], . . . , MUX3[1], MUX3[2], . . . , first to third holding latches HL1[1], HL1[2], HL2[1], HL2[2], . . . , HL3[1], HL3[2], . . . , first to third sampling latches SL1[1], SL1[2], . . . , SL2[1], SL2[2], SL3[1], SL3[2], . . . , and first to third shift registers SR1[1], SR1[2], . . . , SR2[1], SR2[2], . . . , SR3[1], SR3[2], . . . . In such an embodiment, the elements listed above are substantially the same as those described with reference to FIG. 12, and any repetitive detailed descriptions thereof will be omitted.

Figure 14:
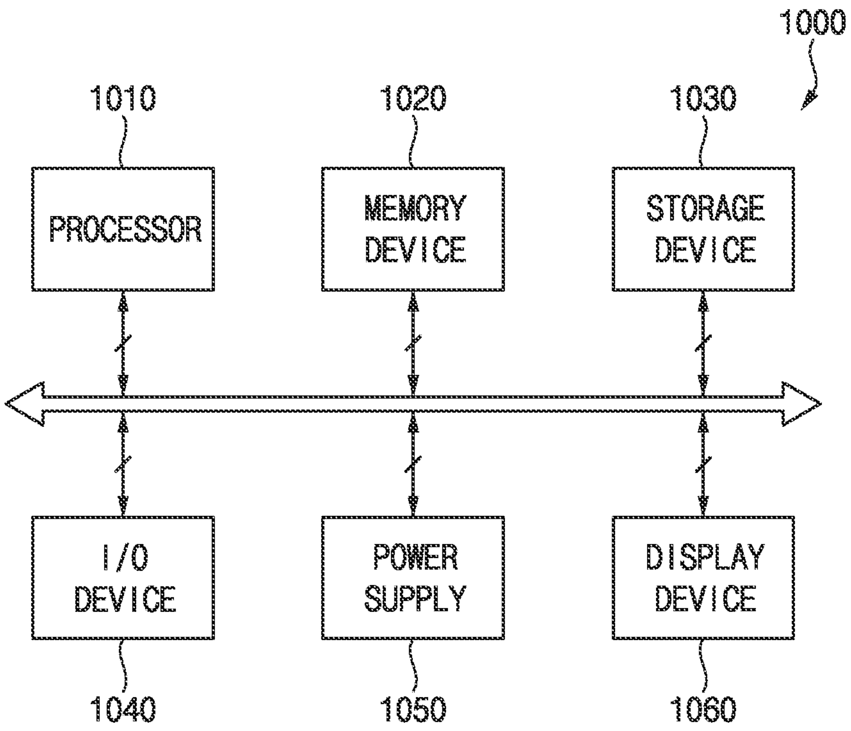
FIG. 14 is a block diagram showing an electronic device according to embodiments of the disclosure.
Figure 15:
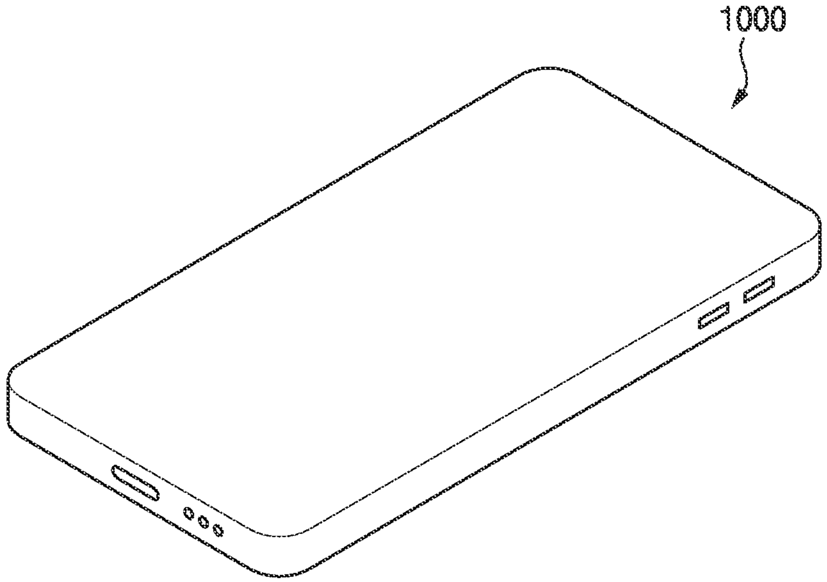
FIG. 15 is a diagram showing one example in which the electronic device of FIG. 14 is implemented as a smart phone.

FIG. 14 is a block diagram showing an electronic device 1000 according to embodiments of the disclosure, and FIG. 15 is a diagram showing one example in which the electronic device of FIG. 14 1000 is implemented as a smart phone.

Referring to FIGS. 14 and 15, an embodiment of the electronic device 1000 may include a processor 1010, a memory device 1020, a storage device 1030, an input/output (I/O) device 1040, a power supply 1050, and a display device 1060. Here, the display device 1060 may be the display device of FIG. 1. In an embodiment, the electronic device 1000 may further include a plurality of ports for communicating with a video card, a sound card, a memory card, a universal serial bus (USB) device, other electronic devices, etc. In an embodiment, as shown in FIG. 15, the electronic device 1000 may be implemented as a smart phone. However, the electronic device 1000 is not limited thereto. In an alternative embodiment, for example, the electronic device 1000 may be implemented as a cellular phone, a video phone, a smart pad, a smart watch, a tablet personal computer (PC), a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch-pad, a touch-screen, etc., and an output device such as a printer, a speaker, etc. In some embodiments, the I/O device 1040 may include the display device 1060.

The power supply 1050 may provide power for operations of the electronic device 1000. In an embodiment, for example, the power supply 1050 may be a power management integrated circuit (PMIC).

The display device 1060 may display an image corresponding to visual information of the electronic device 1000. Here, the display device 1060 may be an organic light emitting display device or a quantum-dot light emitting display device. However, the display device 1060 is not limited thereto. The display device 1060 may be coupled to other components via the buses or other communication links. The display device 1060 may have a wide channel width through various channel arrangements as compared with a case where one channel is connected to each of sub-pixels in one pixel row.

Embodiments of the disclosure may be applied to a display device and an electronic device including the display device. In an embodiment, for example, the disclosure may be applied to a digital television, a three-dimensional (3D) television, a smart phone, a cellular phone, a PC, a tablet PC, a virtual reality (VR) device, a home appliance, a laptop, a personal digital assistant (PDA), a portable media player (PMP), a digital camera, a music player, a portable game console, a car navigation system, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including pixels arranged along a plurality of pixel lines, each pixel line extending in a first direction;

a data driver which applies data voltages to the pixels; and a timing controller which controls the data driver, wherein the data driver includes:

first channels which applies the data voltages to the pixels of first pixel lines and is adjacent to the display panel in the first direction; and second channels which applies the data voltages to the pixels of second pixel lines and is adjacent to the first channels in the first direction, wherein each of the pixels has a pixel width and each of the first channels and the second channels has a channel width that is six times the pixel width.

2. The display device of claim 1, wherein at least one of the first pixel lines is a $(2N-1)^{th}$ pixel line, wherein N is a positive integer, and wherein at least one of the second pixel lines is a $2N^{th}$ pixel line.

3. The display device of claim 1, wherein each of the pixels includes sub-pixels, wherein each of the first channels is connected to the sub-pixels of the pixels of a corresponding one of the first pixel lines, and wherein each of the second channels is connected to the sub-pixels of the pixels of a corresponding one of the second pixel lines.

4. The display device of claim 3, wherein the data driver generates the data voltages applied to the sub-pixels based on a common gamma reference voltage.

5. The display device of claim 1, wherein each of the pixels includes a first color sub-pixel which displays a first color, a second color sub-pixel which displays a second color, and a third color sub-pixel which displays a third color, wherein at least one of the first channels is connected to the first color sub-pixel of each of the pixels of at least two of the first pixel lines, and wherein at least one of the second channels is connected to the first color sub-pixel of each of the pixels of at least two of the second pixel lines.

6. The display device of claim 5, wherein the data driver generates the data voltages applied to the first color sub-pixel based on a first color gamma reference voltage for the first color, generates the data voltages applied to the second color sub-pixel based on a second color gamma reference voltage for the second color, and generates the data voltages applied to the third color sub-pixel based on a third color gamma reference voltage for the third color.

7. The display device of claim 1, wherein the data driver is mounted on the display panel.

8. A display device comprising:

a display panel including pixels arranged along a plurality of pixel lines, each pixel line extending in a first direction;

a data driver which applies data voltages to the pixels; and a timing controller which controls the data driver, wherein the data driver includes:

first channels which applies the data voltages to the pixels of first pixel lines and is adjacent to the display panel in the first direction; and second channels which applies the data voltages to the pixels of second pixel lines and is adjacent to the first channels in the first direction, wherein each of the pixels has a pixel width and each of the first channels and the second channels has a channel width that is six times the pixel width.

9. The display device of claim 8, wherein at least one of the first pixel lines is a $(2N-1)^{th}$ pixel line, wherein N is a positive integer, and wherein at least one of the second pixel lines is a $2N^{th}$ pixel line.

10. The display device of claim 8, wherein each of the pixels includes sub-pixels, wherein each of the first channels is connected to the sub-pixels of the pixels of a corresponding one of the first pixel lines, and wherein each of the second channels is connected to the sub-pixels of the pixels of a corresponding one of the second pixel lines.

11. The display device of claim 10, wherein the data driver generates the data voltages applied to the sub-pixels based on a common gamma reference voltage.

12. The display device of claim 8, wherein each of the pixels includes a first color sub-pixel which displays a first color, a second color sub-pixel which displays a second color, and a third color sub-pixel which displays a third color, wherein at least one of the first channels is connected to the first color sub-pixel of each of the pixels of at least two of the first pixel lines, and wherein at least one of the second channels is connected to the first color sub-pixel of each of the pixels of at least two of the second pixel lines.

13. The display device of claim 12, wherein the data driver generates the data voltages applied to the first color sub-pixel based on a first color gamma reference voltage for the first color, generates the data voltages applied to the second color sub-pixel based on a second color gamma reference voltage for the second color, and generates the data voltages applied to the third color sub-pixel based on a third color gamma reference voltage for the third color.

14. The display device of claim 8, wherein the data driver further includes:

third channels which applies the data voltages to the pixels of third pixel lines and is adjacent to the second channels in the first direction.

15. The display device of claim 14, wherein at least one of the first pixel lines is a $(3N-2)^{th}$ pixel line, wherein N is a positive integer, wherein at least one of the second pixel lines is a $(3N-1)^{th}$ pixel line, and wherein at least one of the third pixel lines is a $3N^{th}$ pixel line.

16. The display device of claim 14, wherein each of the pixels includes sub-pixels, wherein each of the first channels is connected to the sub-pixels of the pixels of a corresponding one of the first pixel lines, wherein each of the second channels is connected to the sub-pixels of the pixels of a corresponding one of the second pixel lines, and wherein each of the third channels is connected to the sub-pixels of the pixels of a corresponding one of the third pixel lines.

17. The display device of claim 14, wherein each of the pixels includes a first color sub-pixel which displays a first color, a second color sub-pixel which displays a second color, and a third color sub-pixel which displays a third color, wherein at least one of the first channels is connected to the first color sub-pixel of each of the pixels of at least one of the first pixel lines, the first color sub-pixel of each of the pixels of at least one of the second pixel lines, and the first color sub-pixel of each of the pixels of at least one of the third pixel lines, wherein at least one of the second channels is connected to the second color sub-pixel of each of the pixels of at least one of the first pixel lines, the second color sub-pixel of each of the pixels of at least one of the second pixel lines, and the second color sub-pixel of each of the pixels of at least one of the third pixel lines, and wherein at least one of the third channels is connected to the third color sub-pixel of each of the pixels of at least one of the first pixel lines, the third color sub-pixel of each of the pixels of at least one of the second pixel lines, and the third color sub-pixel of each of the pixels of at least one of the third pixel lines.

18. A display device comprising:

a display panel including pixels arranged along a plurality of pixel lines, each pixel line extending in a first direction;

a data driver which applies data voltages to the pixels;

a timing controller which controls the data driver; and an integrated channel including a first source amplifier which applies the data voltages to the pixels of a first pixel line and is adjacent to the display panel in the first direction, and a second source amplifier which applies the data voltages to the pixels of a second pixel line and is adjacent to the first source amplifier in the first direction, wherein each of the pixels has a pixel width and the integrated channel has a channel width that is at least six times the pixel width.

19. The display device of claim 18, wherein the integrated channel further includes:

a first digital-to-analog converter which applies the data voltages to the first source amplifier and is adjacent to the second source amplifier in the first direction; and a second digital-to-analog converter which applies the data voltages to the second source amplifier and is adjacent to the first digital-to-analog converter in the first direction.

20. The display device of claim 18, wherein the integrated channel further includes:

a third source amplifier which applies the data voltages to the pixels of a third pixel line and is adjacent to the second source amplifier in the first direction;

a first digital-to-analog converter which applies the data voltages to the first source amplifier and is adjacent to the third source amplifier in the first direction;

a second digital-to-analog converter which applies the data voltages to the second source amplifier and is adjacent to the first digital-to-analog converter in the first direction; and a third digital-analog converter which applies the data voltages to the third source amplifier and is adjacent to the second digital-analog converter in the first direction.

* * * * *